US012780979B2

(12) United States Patent
He et al.

(10) Patent No.: US 12,780,979 B2
(45) Date of Patent: Nov. 3, 2026

(54) METHODS OF SYNTHESIZING MULTI-HYDROGEN BONDING OLIGOMERS

(71) Applicant: Covestro (Netherlands) B.V., Geleen (NL)

(72) Inventors: Meng He, South Elgin, IL (US); Sam Hsieh, Xianxi Hsiang (TW); Jim Lin, Xianxi Hsiang (TW); Wenders Wen, Xianxi Hsiang (TW)

(73) Assignee: Covestro (Netherlands) B.V., Geleen (NL)

( * ) Notice: Subject to any disclaimer, the term of this patent is extended or adjusted under 35 U.S.C. 154(b) by 886 days.

(21) Appl. No.: 17/913,704

(22) PCT Filed: Mar. 31, 2021

(86) PCT No.: PCT/US2021/025048

§ 371 (c)(1),
(2) Date: Sep. 22, 2022

(87) PCT Pub. No.: WO2021/202639

PCT Pub. Date: Oct. 7, 2021

(65) Prior Publication Data

US 2023/0117457 A1 Apr. 20, 2023

Related U.S. Application Data

(60) Provisional application No. 63/004,558, filed on Apr. 3, 2020.

(51) Int. Cl.

| | |
|---|---|
| ***C08G 18/38*** | (2006.01) |
| ***C08F 290/06*** | (2006.01) |
| ***C08G 18/12*** | (2006.01) |
| ***C08G 18/24*** | (2006.01) |
| ***C08G 18/32*** | (2006.01) |
| ***C08G 18/48*** | (2006.01) |
| ***C08G 18/61*** | (2006.01) |
| ***C08G 18/67*** | (2006.01) |
| ***C08G 18/73*** | (2006.01) |
| ***C08G 18/75*** | (2006.01) |
| *C08J 5/18* | (2006.01) |

(52) U.S. Cl.

CPC ...... *C08G 18/3848* (2013.01); *C08F 290/067* (2013.01); *C08G 18/12* (2013.01); *C08G 18/246* (2013.01); *C08G 18/3206* (2013.01); *C08G 18/3863* (2013.01); *C08G 18/4825* (2013.01); *C08G 18/61* (2013.01); *C08G 18/672* (2013.01); *C08G 18/73* (2013.01); *C08G 18/755* (2013.01); *C08J 5/18* (2013.01); *C08J 2371/02* (2013.01)

(58) Field of Classification Search

CPC ................ C08G 18/3848; C08G 18/12; C08G 18/3863; C08G 18/4825; C08G 18/672; C08G 18/755; C08F 290/067; C08J 5/18; C08J 2371/02; C09D 175/04; C09D 175/08; C09D 175/16

See application file for complete search history.

(56) References Cited

U.S. PATENT DOCUMENTS

| | | | | |
|---|---|---|---|---|
| 6,320,018 | B1 | 11/2001 | Sijbesma et al. | |
| 6,803,447 | B2 | 10/2004 | Janssen et al. | |
| 7,067,564 | B2 | 6/2006 | Bulters et al. | |
| 2003/0192455 | A1 | 10/2003 | Six et al. | |
| 2004/0034190 | A1 | 2/2004 | Janssen et al. | |
| 2009/0278084 | A1 | 11/2009 | Messana et al. | |
| 2020/0017706 | A1 * | 1/2020 | Matthews ................ | G02B 6/10 |

FOREIGN PATENT DOCUMENTS

| | | | |
|---|---|---|---|
| CN | 105860017 | A | 8/2016 |
| CN | 106543412 | A | 3/2017 |
| CN | 106589287 | A | 4/2017 |
| CN | 107325256 | A | 11/2017 |
| CN | 108410111 | A | 8/2018 |
| CN | 110591542 | A | 12/2019 |
| EP | 3611213 | A1 | 2/2020 |
| GB | 1565124 | A | 4/1980 |
| JP | 2014210719 | A | 11/2014 |
| KR | 20190083551 | A | 7/2019 |

OTHER PUBLICATIONS

Polyurethane Review, RSC Advances (Year: 2016).*
Machine Translation of CN 108410111 from Google Patents used for Structures (Year: 2018).*
Xu Macromolecular Chemistry and Physics (Year: 2016).*
Gao Progress in Organic Coatings vol. 113 pp. 160-167 (Year: 2017).*

(Continued)

*Primary Examiner* — Heidi R Kelley
*Assistant Examiner* — Adam J Berro
(74) *Attorney, Agent, or Firm* — Donald R. Palladino

(57) ABSTRACT

Disclosed herein are methods for synthesizing oligomer mixtures with one or more moieties capable of forming a multi-hydrogen bonding dimer. The method comprises the steps of providing certain intermediate reaction products; adding a polyol component to the intermediate reaction product to yield an oligomer mixture comprising one or more multi-hydrogen bonding groups; and further reacting the mixture with certain isocyanate-reactive compounds to yield a multi-hydrogen bonding oligomer, wherein solvents comprise less than 50% of the total by weight of all reagents used in the synthesis of the multi-hydrogen bonding oligomer. Preferably, such methods involve no separation, distillation, or isolation of any intermediate product, and as such, they are particularly useful for a continuous or one-pot synthesis.

16 Claims, No Drawings

(56) References Cited

OTHER PUBLICATIONS

Gao, Fei et al, "Properties of UV-cured self-healing coatings prepared with PCDL-based polyurethane containing multiple H-bonds", Progress in Organic Coatings, vol. 113, Sep. 21, 2017, pp. 160-167.
Canadell, Judit et al, Macromolecules 2011, 44, pp. 2536-2541.
Lewis, David F.V., The Scientific World Journal (2004) 4, pp. 1074-1082.
Sevier, Carolyn S. et al., Nature 2002, vol. 3, pp. 836-847.
International Search Report, PCT/US2021/025048, date of mailing: Jul. 26, 2021, Authorized officer: Florian Paulus.
Xiaoyi, Yang et al., "Synthesis and Application of UV Curable Self-Healing Resin", Paint & Coatings Industry, vol. 46, No. 6, Jun. 2016, English Abstract.
Peerlings, H.W.I. et al., Fast and Convenient Construction of Carbamate/Urea-Based Dendrimers with a Diisocyanate Building Block, Journal of Polymer Science: Part A: Polymer Chemistry, vol. 39, pp. 3112-3120, Jun. 1, 2001.

* cited by examiner

METHODS OF SYNTHESIZING MULTI-HYDROGEN BONDING OLIGOMERS

CROSS REFERENCE TO RELATED APPLICATIONS

This application is a national stage application under 35 U.S.C. § 371 of PCT/US2021/025048, filed Mar. 31, 2021, which claims priority to U.S. Provisional Application No. 63/004,558, filed 3 Apr. 2020, each of which is hereby incorporated by reference in their entirety as if fully set forth herein.

TECHNICAL FIELD

The present invention relates to methods for producing oligomers which are capable of forming multi-hydrogen bonding dimers.

BACKGROUND

Self-healing materials are known. Self-healing materials facilitate reversible interactions or covalent reactions in a self-complementary fashion, such as through the use of multi-hydrogen bonding, and typically without the express requirement of an external stimulus such as the application of radiation energy including UV or heat. Via such a process otherwise known as self-assembly, self-healing materials can contribute to enabling a polymeric material to self-heal and/or exhibit improved stress-relaxation characteristics.

A known multi-hydrogen bonding functional group includes ureido pyrimidinones. References such as, Janssen et al. (U.S. Pat. No. 6,803,447) and Sijbesma et al. (U.S. Pat. No. 6,320,018), disclose such self-complementary units which are based on 2-ureido-4-pyrimidones (UPy). Although UPy groups are preferred for their ability to form strong reversible bonds, due in part to their ready natural tendency dimerize, conventional small molecules or oligomers containing such UPy moieties exhibit poor solubility and/or miscibility not only with solvents, but also with other monomers and/or oligomers typically present in coatings. In order to increase its solubility, the molecular weight of an oligomer can be increased, as is disclosed in *Progress in Organic Coatings* 113 (2017) 160-167. However in this case, the concentration of self-healing moieties also necessarily decreases to levels such that self-healing and/or stress-relaxation efficacy is detrimentally effected to the point where it may become insufficient for the demands and conditions experienced in various applications, including coatings for optical fibers. Furthermore, traditional self-healing components typically require large amounts to solvents to synthesize, and in any event frequently result in crystalline or solid materials with a high melting point or glass transition temperature (Tg). Therefore, the conventional selection of self-healing components has been limited to those having poor solubility, a low self-healing moiety content, and/or those which require large amounts of solvents to synthesize.

It would be desirable to provide for a method of synthesizing small molecules or oligomers which are capable of forming multi-hydrogen bonding dimers such that self-healing and/or stress relaxation properties can be imparted therefrom which overcome one or more than one of the problems mentioned above. Additionally or alternatively, it would be desirable to provide for methods of producing oligomers which are capable of being readily processable in their intended application while maintaining large quantities of multi-hydrogen bonding groups such that the products created therefrom might possess desirable self-healing characteristics and/or stress-relaxation behavior.

BRIEF SUMMARY

The instant invention relates to various methods of synthesizing an oligomer mixture with one or more moieties capable of forming a multi-hydrogen bonding dimer, the method comprising the steps of (1) providing an intermediate reaction product which is the reaction product of a multi-hydrogen bonding group precursor compound having an amino group with a multifunctional isocyanate compound; (2) adding a polyol component directly to the intermediate reaction product to yield an oligomer mixture comprising one or more multi-hydrogen bonding groups; and (3) further reacting the oligomer mixture with an isocyanate-reactive compound also optionally having at least one additional reactive group to yield one or more multi-hydrogen bonding oligomers; wherein a quantity of unreacted isocyanate groups remains present in the intermediate reaction product after completion of step (1) and in the oligomer mixture after completion of step (2); and wherein, relative to all reagents used in the synthesis of the one or more multi-hydrogen bonding oligomers, solvents comprise less than 50% of the total by weight, preferably less than 30 wt. %, preferably less than 5 wt. %, preferably less than 1 wt. %, preferably 0 wt. %.

According to other embodiments of the first aspect, the process is carried out such that no separation, distillation, or isolation of any non-final reaction product. In an embodiment, the method is a continuous or one-pot method.

According to further embodiments, the one or more multi-hydrogen bonding oligomers created from the process is according to formula (VII):

$$[UPy\text{-}(D_m\text{-}U\text{-}D_m)_{(2+q)}]\text{-}[A(G)_{(n-1)}\text{-}D_m]_k\text{-}Z \qquad \text{(VII)};$$

wherein

- UPy represents a UPy group, wherein the UPy group is a 2-ureido-4-pyrimidinone;
- U represents —NHC(O)E- or -EC(O)NH—, wherein E is O, NH, N(alkyl), or S;
- q is a number greater than or equal to 0 and less than or equal to 10; preferably q is greater than 0, or 2+q is a number larger than 2 and less than or equal to 4, or larger than 4 and less than or equal to 10.
- k is a number from 0 to 20;
- A is selected from carbon and nitrogen;
- n is 2 or 3, wherein when A is an sp3 carbon, n=3, and when A is an sp2 carbon or a nitrogen, n=2;
- m is an integer from 0 to 500;
- D is, for each occurrence of m, a divalent spacer independently chosen from —O—, —C(O)—, -Aryl-, —C≡C—, —N═N—, —S—, —S(O)—, —S(O)(O)—, —$(CT_2)_i$-, —N(T)-, —$Si(T)_2(CH_2)_i$—, —$(Si(T)_2O)_i$—, —C(T)═C(T)-, —C(T)═N—, —C(T)═, —N═, or combinations thereof;

wherein

- for each instance in D of a single bond, a single bond is connected thereto, and for each instance in D of a double bond, a double bond is connected thereto; wherein
- each T is selected for each occurrence from single valent units including hydrogen, F, Cl, Br, I, $C_1$-$C_8$ alkyl, $C_1$-$C_8$ alkoxy, substituted amino, or substituted aryl;

wherein each T can also be selected from divalent $D_m$ and connects to another divalent T that's also selected from $D_m$ and form a ring structure; and and i is an integer from 1-40;

Z is chosen from a hydrogen, acryloyloxy, methacryloyloxy, hydroxy, amino, vinyl, alkynyl, azido, silyl, siloxy, silylhydride, thio, isocyanato, protected isocyanato, epoxy, aziridino, carboxylic acid, hydrogen, F, Cl, Br, I, or maleimido group; and G is, for each occurrence of n, independently selected from hydrogen, $-D_m-Z$, or a self-healing moiety according to the following structure (VII-b):

$$(Z\text{-}D_m)_jX\text{-}D_m\text{-} \qquad \text{(VII-b);}$$

wherein

X is a multi-hydrogen bonding group, a disulfide group, or a urea group;

j=1 when X is divalent, and j=0 when X is monovalent.

DETAILED DESCRIPTION

The invention relates to a method for synthesizing an oligomer mixture with one or more moieties capable of forming a multi-hydrogen bonding dimer, the method comprising the steps of:

(1) providing an intermediate reaction product which is the reaction product of a multi-hydrogen bonding group precursor compound having an amino group with a multifunctional isocyanate compound;

(2) adding a polyol component directly to the intermediate reaction product to yield an oligomer mixture comprising one or more multi-hydrogen bonding groups;

(3) further reacting the oligomer mixture with an isocyanate-reactive compound also optionally having at least one additional reactive group to yield one or more multi-hydrogen bonding oligomers;

wherein a quantity of unreacted isocyanate groups remains present in the intermediate reaction product after completion of step (1) and in the oligomer mixture after completion of step (2); and wherein, relative to all reagents used in the synthesis of the one or more multi-hydrogen bonding oligomers, solvents comprise less than 50% of the total by weight, preferably less than 30 wt. %, preferably less than 5 wt. %, preferably less than 1 wt. %, preferably 0 wt. %.

Methods according to the instant invention involve the step of providing an intermediate reaction product. This intermediate reaction product is the reaction product of a multi-hydrogen bonding group precursor compound having an amino group with a multifunctional isocyanate compound. The multi-hydrogen bonding group precursor compound is one that, when reacted, yields multi-hydrogen bonding groups. Hydrogen bonding groups are those which form hydrogen bonds, either during polymerization or while the composition remains in an uncured, liquid state. In an embodiment, the hydrogen bonding groups are multi-hydrogen bonding groups. As used herein, a "multi-hydrogen bonding group" is one which is configured to provide at least three hydrogen bonds in a dimer formed from two molecules containing the same or a different self-healing moiety. A preferred type of multi-hydrogen bonding group includes a 2-ureido-4-pyrimidinone (UPy) group. UPy groups, or moieties (such terms are used interchangeably herein), are desirable because they are known to be self-complementary and produce strong multi-hydrogen bonding effects, such as on the order of approximately 14 kcal/mol, as calculated based on direct addition of hydrogen bonding energy without considering secondary interaction effect. This is far less than the bond dissociation energy between a single covalent bond (such as a carbon-carbon bond, which is on the order of approximately 100 kcal/mol), but it exceeds that of other hydrogen bonding groups, such as N—H---:O and N—H---:N, among others (which are estimated at between 2-8 kcal/mol). As such, UPy moieties can produce a so-called "super" hydrogen bonding effect. A non-limiting example of a UPy group is 6-methyl-2-ureido-4-pyrimidinone, according to the following chemical structure:

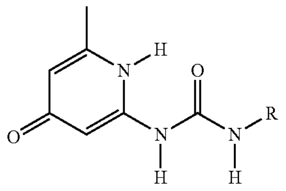

UPy groups may be formed as a reaction product of a multi-hydrogen bonding group precursor having an amino group. A non-limiting example of such a multi-hydrogen bonding group precursor is 2-amino-4-hydroxy-6-methyl-pyrimidine, which possesses the following chemical structure:

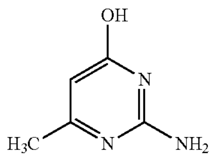

UPy groups may be formed as a reaction product of other multi-hydrogen bonding group precursors having an amino group, such as 2-amino-4-hydroxy-pyrimidine, 2-amino-4-hydroxy-6-ethyl-pyrimidine, 2-amino-4-hydroxy-6-propyl-pyrimidine, 2-amino-4-hydroxy-6-butyl-pyrimidine, 2-amino-4-hydroxy-6-hexyl-pyrimidine, 2-amino-4-hydroxy-6-octyl-pyrimidine and 2-amino-4-hydroxy-6-(2-hydroxylethyl)-pyrimidine.

The intermediate reaction product also involves the reaction of the aforementioned components with a multifunctional isocyanate compound. The reaction product of a (poly)isocyanate compound, preferably a diisocyanate compound, may be utilized to create the urethane group or moiety in the intermediate reaction product. As used herein, an isocyanate compound is defined as any organic compound which possesses at least one isocyanate group per molecule. Examples of suitable isocyanates include diisocyanates such as 2,4-tolylene diisocyanate, 2,6-tolylene diisocyanate, (hydrogenated) xylylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, 2,4,4 trimethylhexamethylene diisocyanate, hexamethylene diisocyanate, 2,4- and/or 4,4'-methylenedicyclohexyl diisocyanate, methylenediphenyl diisocyanate, tetramethylxylene diisocyanate, 1,5-pentane diisocyanate, bis(2-isocyanato-ethyl)fumarate, 6-isopropyl- 1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, and the like.

These diisocyanate compounds may be used either individually or in combinations of two or more. In various embodiments, the diisocyanates include isophorone diisocyanate, 2,2,4-trimethylhexamethylene diisocyanate, 2,4,4 trimethylhexamethylene diisocyanate and hexamethylene diisocyanate, 2,4-tolylene diisocyanate, and/or 2,6-tolylene diisocyanate (a mixture of the two aforementioned diisocyanates is provided commercially under the common name "TDI") Particularly preferred diisocyanates include trimethylhexamethylene diisocyanate (TMDI) compounds and isophorone diisocyanate (IPDI) compounds.

As used herein, "multifunctional" indicates that the isocyanate compound has two or more isocyanate moieties per molecule. In addition to the diisocyanates specified above, polyisocyanates having three isocyanate groups per molecule, i.e. triisocyanates, may also be used. Known triisocyanates include biurets made from hexamethylene diisocyanate (HDI) or HDI trimers, which are commercially available from Covestro under the Desmodur® tradename and including, without limitation, Desmodur N 3200, Desmodur N 3300, Desmodur N 3390, Desmodur N 3600, Desmodur N 3800, Desmodur N 3900, Desmodur N XP 2580, Desmodur XP 2599, Desmodur XP 2675, Desmodur XP 2731, Desmodur XP 2714 and Desmodur XP 2803.

Further commercially-available triisocyanates include the Vestanat® T (IPDI-trimer) and HT (HDI-trimer) lines of polyisocyanate crosslinkers for 2k systems, available from Evonik.

The intermediate reaction product may be provided as a pre-reacted material sourced from a third-party in order to practice the instant invention. Alternatively, the method involves practicing of the reaction yielding the intermediate reaction product as well.

Accordingly, in an embodiment, if the method involves practicing the reaction yielding the intermediate reaction product, then step (1) is preceded by the step of reacting the multi-hydrogen bonding group precursor compound having an amino group with the multifunctional isocyanate compound. The reaction will occur using equipment and reaction conditions known to the skilled artisan to which this invention relates. For example, however, in an embodiment, the reaction yielding the intermediate reaction product occurs preferably in an inert environment under nitrogen protection, at a temperature of between 110-160° C., or between 120-150° C., or between 135-145° C. until mixture becomes clear. Any suitable quantity of each reactant may be used depending on the type and nature of the intermediate reaction product to be created, however in a preferred embodiment, the reactants are included such that for every equivalent (per 100 g) of the multi-hydrogen bonding group precursor compound having the amino group, at least 3 equivalents of the multifunctional isocyanate compound are present, or up to 8 equivalents of the multifunctional isocyanate compound.

It will be understood that if step (1) is preceded by a reaction of a multifunctional isocyanate with the multi-hydrogen bonding group precursor compound having an amine group, a quantity of unreacted isocyanate groups remains present in the intermediate reaction product after completion of any reaction. Similarly a quantity of unreacted isocyanate groups will be present in the intermediate reaction product if provided separately. This is important as such unreacted isocyanate groups will be further reacted with the polyol component in step (2).

Next, the method of the instant invention involves adding a polyol component directly to the intermediate reaction product to yield an oligomer mixture comprising one or more multi-hydrogen bonding groups. The polyol is added directly in the sense that the intermediate reaction product is not modified further prior to the addition. Accordingly, in a preferred embodiment, the intermediate reaction product is further reacted with the polyol component without first separating, isolating, or distilling the intermediate reaction product from any other reactant used or impurities contained within the reactor vessel. Indeed, it is preferred that the addition of the polyol component occurs in the same vessel used to create or provide the intermediate reaction product.

As used herein, "polyol" is meant to include any compound having two or more than two hydroxyl groups per molecule. One hydroxyl group of the polyol component is reactive with an isocyanate moiety of the intermediate reaction product. The moiety or moieties between two successive hydroxyl groups may be of any suitable type, but are chosen to extend the chain length of the oligomer being synthesized. The polyol itself may also be of any suitable type, but preferably the polyol component comprises, consists of, or consists essentially of a polyether polyol, a polyester polyol, a poly(dimethylsiloxane), a disulfide polyol, or mixtures thereof.

In a preferred embodiment, the polyol component comprises a polypropylene glycol (PPG). As used herein, a compound derived from a polypropylene glycol includes an endcapped PPG, such as an EO-endcapped PPG. There are no specific limitations to the manner of polymerization of the structural units in these polyols. Each of random polymerization, block polymerization, or graft polymerization is acceptable.

Given as examples of the polyether polyols are polyethylene glycol, polypropylene glycol, polypropylene glycol-ethylene glycol copolymer, polytetramethylene glycol, polyhexamethylene glycol, polyheptamethylene glycol, polydecamethylene glycol, and polyether diols obtained by ring-opening copolymerization of two or more ion-polymerizable cyclic compounds. Here, given as examples of the ion-polymerizable cyclic compounds are cyclic ethers such as ethylene oxide, propylene oxide, isobutene oxide, tetrahydrofuran, 2-methyltetrahydrofuran, 3-methyltetrahydrofuran, dioxane, trioxane, tetraoxane, cyclohexene oxide, styrene oxide, epichlorohydrin, isoprene monoxide, vinyl oxetane, vinyl tetrahydrofuran, vinyl cyclohexene oxide, phenyl glycidyl ether, butyl glycidyl ether, and glycidyl benzoate. Specific examples of combinations of two or more ion-polymerizable cyclic compounds include combinations for producing a binary copolymer such as tetrahydrofuran and 2-methyltetrahydrofuran, tetrahydrofuran and 3-methyltetrahydrofuran, and tetrahydrofuran and ethylene oxide; and combinations for producing a ternary copolymer such as a combination of tetrahydrofuran, 2-methyltetrahydrofuran, and ethylene oxide, a combination of tetrahydrofuran, butene-1-oxide, and ethylene oxide, and the like. The ring-opening copolymers of these ion-polymerizable cyclic compounds may be either random copolymers or block copolymers.

Included in these polyether polyols are products commercially available such as, for example, PTMG1000, PTMG2000 (manufactured by Mitsubishi Chemical Corp.), PEG #1000 (manufactured by Nippon Oil and Fats Co., Ltd.), PTG650 (SN), PTG1000 (SN), PTG2000 (SN), PTG3000, PTGL1000, and PTGL2000 (manufactured by Hodogaya Chemical Co., Ltd.), PEG 400, PEG 600, PEG 1000, PEG 1500, PEG 2000, PEG 4000, and PEG 6000 (manufactured by Daiichi Kogyo Seiyaku Co., Ltd.), P710R, P1010, P2010, and the 1044 Pluracol® P Series (by BASF), the Acrol® and Acclaim® series including PPG725, PPG1000, PPG2000, PPG3000, PPG4000, and PPG8000, as well as the Multranol® series including PO/EO polyether diols having a Mw of 2800 or 40000 (by Covestro). Additionally, AGC Chemicals provides diols under the trade name Preminol®, such as Preminol S 4013F (Mw 12,000), Preminol 4318F (Mw 18,000), and Preminol 5001F (Mw 4,000).

Polyester diols obtained by reacting a polyhydric alcohol and a polybasic acid are given as examples of the polyester polyols. Examples of the polyhydric alcohol include ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like. Examples of the polybasic acid include phthalic acid, dimer fatty acid, isophthalic acid, terephthalic acid, maleic acid, fumaric acid, adipic acid, sebacic acid, cyclohexanedicarboxylic acid, hexahydrophthalic acid/anhydride, and the like. Preferably, the polybasic acid is selected so that the resulting polyester polyol is unsaturated.

These polyester polyol compounds are commercially available under the trade names such as MPD/IPA500, MPD/IPA1000, MPD/IPA2000, MPD/TPA500, MPD/TPA1000, MPD/TPA2000, Kurapol® A-1010, A-2010, PNA-2000, PNOA-1010, and PNOA-2010 (manufactured by Kuraray Co., Ltd.).

Triols, such as polyester or polyether triols are also known. Especially preferred are oligo-triols, which have the general formula: $A(\text{-----}OH)_3$; wherein A is a chemical organic structure, such as an aliphatic, cycloaliphatic, aromatic, or heterocyclic structure, "-----" is an oligomeric chain, such as a polyether chain, a polyester chain, a polyhydrocarbon chain, or a polysiloxane chain, to name a few, and "OH" is a terminal hydroxy group. In an embodiment, the triol comprises, consists of, or consists essentially of a polyether triol, a PO homopolymer, a PE homopolymer, PO-EO block copolymers, random copolymer or hybrid block-random copolymers. In practice, polyether triols may be based on glycerol or trimethylolpropane, PO, EO or PO and EO copolymer with EO on terminal block or internal block and a $MW_{theo}$ from approximately 500 to 15,000 g/mol. Another type of polyether triol are copolymers based on glycerol or trimethylolpropane, such as THF-PO, THF-EO, THF-PO-EO or THF-EO-PO and having a molecular weight between about 500 and 15,000. In a preferred embodiment, the triol is derived from bio-based or natural reactants, such as certain vegetable oils and fats.

Commercial examples of suitable triols include the relevant propylene oxide-based polyether triols available from Carpenter under the Carpol® GP-designation, such as GP-1000, GP-1500, GP-1500-60, GP-3000, GP-4000, GP-5017, GP-5017-60, GP-5171, GP-6015, GP-6015-60, GP-6037-60, and GP-700. Further triols are commercially available from Covestro under the Arcol® brand, such as Arcol LHT-240 (Molecular weight "Mw" stated by the manufacturer of approximately 700), Arcol LHT-112 (Mw 1500), Arcol LHT LG-56 (Mw 3000), and Arcol LHT-42 (Mw 4200), the Multranol® tradename such as Multranol 9199 (Mw 4525), Multranol 3900 (Mw 4800), Multranol 3901 (Mw 6000), and Multranol 9139 (Mw 6000), as well as those under the trade name Acclaim® such as Acclaim 703 (Mw 700), Acclaim 3300N (Mw 3000), Acclaim 6300 (Mw 6000), and Acclaim 6320 (Mw 6000). Additionally, AGC Chemicals provides triols under the trade name Preminol®, such as Preminol S 3011 (Mw 10,000), Preminol 7001K (Mw 7,000), and Preminol 7012 (Mw 10,000).

The theoretical molecular weight derived from the hydroxyl number of these polyols is usually from about 50 to about 15,000, and preferably from about 500 and 12,000, or from about 1,000 to about 8,000.

In reacting the intermediate reaction product with the polyol component described herein, the resultant product is herein characterized as an oligomer mixture with one or more multi-hydrogen bonding groups. As with regards to step (1), in a preferred embodiment, the oligomer mixture containing one or more hydrogen-bonding groups which results from step (2) is not further separated, distilled, or isolated from any other reactant or impurity which may be present. Indeed, preferably the oligomer mixture remains in the same reaction vessel in which step (1) and step (2) were carried out.

The reaction of step (2) will be performed utilizing equipment and process conditions known to the skilled artisan to which this invention relates. In a specific embodiment, however, it is preferred that the reaction of step (2) is carried out at a temperature of between 60-120° C., or between 80-115° C., or between 90-100° C. for a mixing duration until all or substantially all hydroxyl groups from the polyol component have reacted with the multifunctional isocyanate compound, as determined according to an NCO titration method. Furthermore, there will remain some quantity of unreacted isocyanate groups in the oligomer mixture after completion of step (2). This is important so that the oligomer mixture of step (2) can be further reacted with the isocyanate-reactive compound of step (3) can be reacted to said mixture.

Any suitable quantity of each reactant may be used depending on the type and nature of the oligomer mixture to be created, however in a preferred embodiment, the reactants are included such that for every equivalent (per 100 g) of the multi-hydrogen bonding group precursor compound having the amino group from the intermediate reaction product, at least 1 equivalent of the polyol component is present. In other preferred embodiments, the ratio is from 1:1.5 to 1:6. In a preferred embodiment, there are 2 equivalents of multi-hydrogen bonding group precursor compound having the amino group from the intermediate reaction product.

In order to expedite the reaction, the reaction of the polyol component to the intermediate reaction product of step (2) is preferably carried out in the presence of a catalyst and/or an inhibitor compound. Any suitable catalyst can be used, although preferred catalysts include organometallic tin, bismuth, zinc, lead, copper, iron, dibutyltin dilaurate, dibutyltin diacetate, stannous octoate, bismuth octoate, bismuth neodecanoate, zinc 2-ethylhexanote, or lead octoate, or combinations thereof.

Similarly, any suitable inhibitor can be used, but it is preferred to utilize phenolic inhibitors, such as butylated hydroxytoluene.

Additionally, the method according to the instant invention involves the step of (3) further reacting the oligomer mixture with an isocyanate-reactive compound also optionally having at least one additional reactive group to yield one or more multi-hydrogen bonding oligomers. The compound added in (3) preferably contains an hydroxyl, amino, or thiol group, and further comprises, consists of, or consists essentially of triols or hydroxyl-functional (meth)acrylate monomers. In step (3), the oligomer mixture is further modified so as to functionalize the other end or ends of the oligomer structure. In a preferred embodiment, the structure is so-modified to include one or more polymerizable groups, such as (meth)acrylate groups. This is desirable to make the resulting multi-hydrogen bonding oligomer useful in many end-use industrial processes, such as those which undergo UV curing. Step (3) may also be carried out so as to impart a pendant hydroxyl group or groups on the oligomer structure. Still further embodiments involve the addition of another multi-hydrogen bonding group precursor compound having an amino group, so as to impart multi-hydrogen bonding groups at multiple ends of the oligomer.

The reaction of step (3) may be carried out so as to impart multiple arms or branches to the final multi-hydrogen bonding oligomer. This is preferably carried out by using a triol (or higher) functional compound as a junction point in the oligomer structure between multiple arms or chains.

The reaction of step (3) will be performed utilizing equipment and process conditions known to the skilled artisan to which this invention relates. In a specific embodiment, however, it is preferred that the reaction of step (3) is carried out by first removing nitrogen protection and then controlling the reaction at a temperature of between 60-120° C., or between 80-115° C., or between 90-100° C. for a mixing duration until reaction completion, as determined according to an NCO titration method.

Any suitable quantity of each reactant may be used depending on the type and nature of the oligomer mixture to be created, however in a preferred embodiment, the reactants are included such that for every equivalent (per 100 g) of the multi-hydrogen bonding group precursor compound having the amino group from the intermediate reaction product, at least 0.5 equivalents of the isocyanate-reactive compound also optionally having at least one additional reactive group is present. In other preferred embodiments, the ratio is from 1:0.5 to 1:1.5. In a preferred embodiment, there is about 1 equivalent of the isocyanate-reactive compound also optionally having the at least one additional reactive group for every 1 multi-hydrogen bonding group precursor compound having the amino group from the intermediate reaction product.

In order to expedite the reaction, the reaction of the polyol component to the intermediate reaction product of step (3) is also preferably carried out in the presence of a catalyst and/or an inhibitor compound. Any suitable catalyst can be used, although preferred catalysts include organometallic tin, bismuth, zinc, lead, copper, iron, dibutyltin dilaurate, dibutyltin diacetate, stannous octoate, bismuth octoate, bismuth neodecanoate, zinc 2-ethylhexanote, or lead octoate, or combinations thereof.

Similarly, any suitable inhibitor can be used, but it is preferred to utilize phenolic inhibitors, such as butylated hydroxytoluene.

According to the first aspect, the oligomers produced from the method described above are capable of forming a multi-hydrogen dimer. As used herein, such oligomers will be said to possess a self-healing moiety. As used herein, "moiety" and "group" are used interchangeably. A self-healing moiety is a collection of atoms which together facilitate reversible interactions or covalent reactions with other self-healing moieties in a given composition without the express requirement of an external stimulus, such as the application of radiation energy including UV or heat. Of course, it will be understood that it remains possible that such reversible interactions or covalent reactions can be effectuated or even accelerated via external stimuli. Via this process, which is also known as self-assembly, self-healing moieties contribute to enabling a polymeric material to self-heal and/or exhibit improved stress-relaxation characteristics. It is not necessary for a resultant product using the oligomers into which the self-healing moieties of the present invention are included to exhibit a specific minimum degree of self-healing and/or stress relaxation, as it will be appreciated that the degree of self-healing and/or stress-relaxation will vary with the specific associated formulation and the demands and environmental conditions of the end-use application.

In a preferred embodiment, however, in order to produce a desirable amount of stress-relaxation or self-healing at the temperatures and timescales required of the particular application, a sufficient quantity of self-healing material should be present in the composition from which the optical fiber coating is derived or cured.

One way to characterize the quantity of self-healing groups in a given oligomer or composition is by referring to the equivalents of such groups. As used herein, "equivalents" of self-healing moieties for a given composition are determined by summing the amount of moles of self-healing moieties in the self-healing component (Z), in accordance with the following expression:

$$Z = \frac{N \times Wt}{MM}$$

wherein Wt=the amount by weight of the respective component Z relative to 100 g of the total associated oligomer or composition; N=the number of self-healing moieties present in one molecule of component Z; and MM is the theoretical molecular mass of component Z.

If the complete recipe of an oligomer or composition is not known, the equivalents of self-healing moieties may be determined analytically via any suitable method as will be appreciated by the skilled artisan to which this invention applies, such as via size exclusion chromatography (SEC) or nuclear magnetic resonance (NMR) methods.

For the avoidance of doubt, unless otherwise specified, all "equivalents" values expressed herein relate to equivalents of the desired moiety per 100 g of the entire composition.

In a preferred embodiment, the equivalents of self-healing groups comprise, consist of, or consist essentially of 2-ureido-4-pyrimidinone (UPy) groups. In an embodiment, therefore, the oligomers produced by the methods described herein may additionally include disulfide groups. However, the weaker covalent bonds inherent in, i.a, disulfide groups, are believed to facilitate self-healing and/or stress-relaxation behavior in a coating at low temperatures, as described in *Macromolecules* 2011, 44, 2536-2541. Indeed, the self-healing and/or stress relaxation is a result of an exchange reaction of disulfide groups at even more moderate temperatures.

In various embodiments, the oligomer mixture produced herein will possess, at minimum, a first molecule possessing a first self-healing moiety, and a second molecule possessing a second self-healing moiety, wherein the first self-healing moiety of the first molecule is configured to bond to the second self-healing moiety of the second molecule. In an embodiment, the bond dissociation energy formed between the first self-healing moiety and the second self-healing moiety is between 9 kcal/mol to 100 kcal/mol, or from 9 kcal/mol to 80 kcal/mol, or from 10 kcal/mol to 50 kcal/mol, or from 12 kcal/mol to 50 kcal/mol, or from 12 kcal/mol to 90 kcal/mol, or from 9 kcal/mol to 30 kcal/mol, or from 9 kcal/mol to 20 kcal/mol. The bond dissociation energy may be determined by various suitable methods, a non-limiting example of which can be found via direct addition summary of all bonds of self-healing moieties in accordance with Table 1 of *The Scientific World JOURNAL* (2004) 4, 1074-1082; and Nature 2002, volume 3, 836-847. However in actuality, the bond dissociation energy may actually be higher than the value obtained due to direct addition due to synergistic effects.

The first self-healing moiety and the second self-healing moiety may be different, although in a preferred embodiment, they are the same. In an embodiment, the first and second self-healing moieties are the same and are configured to dimerize. A dimerization is an addition reaction in which two molecules of the same compound react with each other to yield an adduct. Upon forming a dimer, the two molecules will align to preferably form multiple hydrogen bonds. In a preferred embodiment, the dimer will possess at least 3, or at least 4, or from 3 to 4 hydrogen bonds. In an embodiment, the dimer formed will also comprise a first linear chain linked to each of the hydrogen bonds on a side of the first self-healing moiety, and a second linear chain linked to each of the 3 or 4 hydrogen bonds on a side of the second self-healing moiety, wherein each of the first linear chain and the second linear chain comprises less than 7 covalent bonds. A few non-limiting examples of such a dimer configuration of UPy moieties having 4 hydrogen bonds and 6 adjacent covalent bonds on either side of the hydrogen bonds are depicted in structures (I) through (IV) below:

(I)

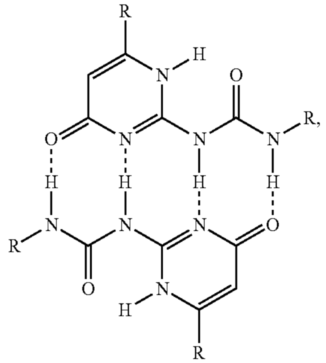

(II)

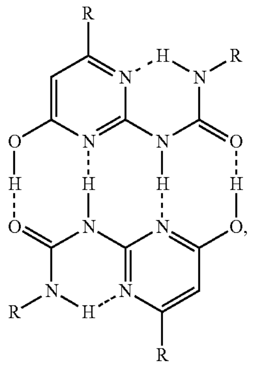

-continued (III)

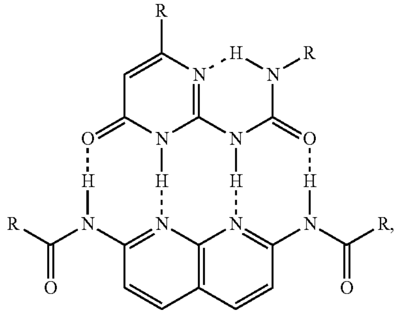

and (IV)

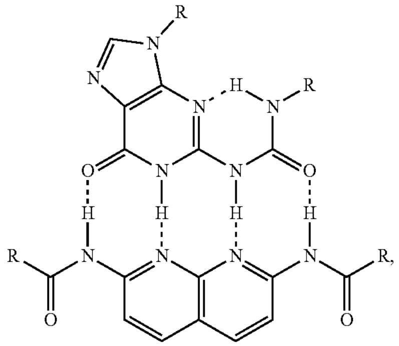

Similarly, a non-limiting example of such a dimer configuration of UPy moieties having 3 hydrogen bonds and 4 adjacent covalent bonds on either side of the hydrogen bonds is depicted in structure (V) below:

(V)

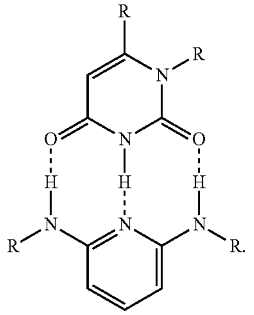

As can be seen in the structures (I) through (V) above, the dimer may also possess a ring structure or fused ring structure. In various embodiments, with respect to each of structures (I) through (V), R may be selected form organic substituents that optionally contain reactive groups attached thereto. In an embodiment, the reactive groups comprise acryloyloxy, methacryloyloxy, hydroxy, amino, vinyl, alkynyl, azido, aziridino, silyl, siloxy, silylhydride, thio, isocyanato, protected isocyanato, epoxy, aziridino, carboxylate, hydrogen, F, Cl, Br, I, or maleimido groups.

In an embodiment, the self-healing component comprises, consists of, or consists essentially of self-healing moieties which are configured to dimerize according to any of structures (I), (II), (III), (IV), and/or (V) as described above.

The full molecular structures into which the self-healing moieties are incorporated can be of any suitable type. In a preferred embodiment, the self-healing moieties are incorporated into reactive urethane oligomers. Such oligomers may be utilized and constructed in similar fashion previously described, with the further addition that a self-healing moiety is added thereto via known reaction mechanisms so as to yield structures which are incorporated in the self-healing component. In embodiments wherein UPy groups are built into urethane oligomers as described elsewhere herein, the diisocyanate(s) used may comprise, consist of, or consist essentially of trimethylhexamethylene diisocyanate (TMDI) compounds and/or isophorone diisocyanate (IPDI) compounds. This is because Inventors have found that, depending upon stoichiometry and the other reactants used, the reaction of precursors to UPy groups and some other diisocyanate compounds (such as hexamethylene diisocyanate) may yield a solid product at room temperature. This has a tendency to make overall oligomer synthesis more costly and/or difficult, particularly on a commercial scale.

Due to the natural tendency for self-healing moieties to self-assemble and/or dimerize, conventional small molecules or oligomers containing self-healing moieties exhibit poor solubility and/or miscibility. In order to increase its solubility, the molecular weight of an oligomer can be increased, as is disclosed in *Progress in Organic Coatings* 113 (2017) 160-167. However in this case, the concentration of self-healing moieties also necessarily decreases to levels such that self-healing and/or stress-relaxation efficacy is detrimentally effected to the point where it may become insufficient for the demands and conditions experienced in various applications, including coatings for optical fibers. Furthermore, traditional self-healing components typically require large amounts to solvents to synthesize, and in any event frequently result in crystalline or solid materials with a high melting point or glass transition temperature (Tg). Therefore, the conventional selection of self-healing components has been limited to those having poor solubility, a low self-healing moiety content, and/or those which require large amounts of solvents to synthesize.

Inventors have surprisingly found that many self-healing oligomers synthesized according to the methods described herein, and in particular those containing at least 3 urethane linkages tend to yield oligomers which have lower viscosity values and/or are more readily processable in an optical fiber coating application, thereby obviating the need for process-hindering solvents, and enabling the use of an increased loading of self-healing content in the associated composition. The addition of large quantities of self-healing components is important to facilitating the creation of a formulation which is suitable for use in producing self-healing and/or stress-relaxing articles that are also capable of ready processability in the intended application.

As stated, in various embodiments, it is desirable to minimize the utilization of solvents. The inclusion of solvents is undesirable because such reagents tend to introduce processing difficulties and/or safety concerns to the optical fiber coating application. Several non-limiting examples of common solvents include 2-propanol, acetone, acetonitrile, chloroform ($CHCl_3$), dichloromethane, dimethyl sulfoxide ($(CH_3)_2SO$), ethyl acetate, hexane, methanol, tetrahydrofuran, toluene, propylene glycol, methyl ethyl ketone, and water, to name a few. To distinguish from reactive diluents which are commonly used in UV-curable compositions, for purposes herein, a reagent is not considered to be a solvent if it possesses one or more acrylate or methacrylate functional groups. The presence of these compounds may be determined via any suitable method such as size exclusion chromatography (SEC) and HPLC; water is also easily quantified by Karl Fischer titration methods. The oligomers produced according to the present invention facilitate the minimization or elimination of such reagents which further do not serve to facilitate the curing, self-healing performance, or physical property formation required of the end-use application. In an embodiment, therefore, relative to all reagents used in the synthesis of the one or more multi-hydrogen bonding oligomers, solvents comprise less than 50% of the total by weight, preferably less than 30 wt. %, preferably less than 5 wt. %, preferably less than 1 wt. %, preferably 0 wt. %.

In an embodiment, the method of the instant invention is carried out such that one or more hydrogen-bonding oligomers according to the following structure (VII) are formed:

$$[UPy\text{-}(D_m\text{-}U\text{-}D_m)_{(2+q)}]\text{-}[A(G)_{(n-1)}\text{-}D_m]_k\text{-}Z \qquad (VII);$$

wherein

UPy represents a UPy group, wherein the UPy group is a 2-ureido-4-pyrimidinone;

U represents —NHC(O)E- or -EC(O)NH—, wherein E is O, NH, N(alkyl), or S;

q is a number greater than or equal to 0 and less than or equal to 10; preferably q is greater than 0, or 2+q is a number larger than 2 and less than or equal to 4, or larger than 4 and less than or equal to 10.

k is a number from 0 to 20;

A is selected from carbon and nitrogen;

n is 2 or 3, wherein when A is an sp3 carbon, n=3, and when A is an sp2 carbon or a nitrogen, n=2;

m is an integer from 0 to 500;

D is, for each occurrence of m, a divalent spacer independently chosen from —O—, —C(O)—, -Aryl-, —C≡C—, —N═N—, —S—, —S(O)—, —S(O)(O)—, —$(CT_2)_i$-, —N(T)-, —$Si(T)_2(CH_2)_i$—, —$(Si(T)_2O)_i$—, —C(T)═C(T)-, —C(T)═N—, —C(T)=, —N═, or combinations thereof;

wherein for each instance in D of a single bond, a single bond is connected thereto, and for each instance in D of a double bond, a double bond is connected thereto; wherein each T is selected for each occurrence from single valent units including hydrogen, F, Cl, Br, I, $C_1$-$C_8$ alkyl, $C_1$-$C_8$ alkoxy, substituted amino, or substituted aryl;

wherein each T can also be selected from divalent $D_m$ and connects to another divalent T that is also selected from $D_m$ and form a ring structure; and and i is an integer from 1-40;

Z is chosen from a hydrogen, acryloyloxy, methacryloyloxy, hydroxy, amino, vinyl, alkynyl, azido, silyl, siloxy, silylhydride, thio, isocyanato, protected isocyanato, epoxy, aziridino, carboxylate, F, Cl, Br, I, or maleimido group; and G is, for each occurrence of n, independently selected from hydrogen, -$D_m$-Z, or a self-healing moiety according to the following structure (VII-b):

$$(Z\text{-}D_m)_jX\text{-}D_m\text{-} \qquad (VII\text{-}b);$$

wherein

X is a multi-hydrogen bonding group or a disulfide group;

j=1 when X is divalent, and j=0 when X is monovalent.

The oligomers described above may further be placed into a composition containing other components, which will vary depending on the end-use application of the composition. However, in an embodiment, the composition contains oligomers according to (VII) in an amount by weight from 30 wt. % to 100 wt. %, or from 30 wt. % to 80 wt. %, or from 30 to 75 wt. %, or from 30 to 70 wt. %, or from 30 to 60 wt.

%; or from 40 wt. % to 80 wt. %, or from 40 wt. to 75 wt. %, or from 40 wt. % to 70 wt. %, or from 40 wt. % to 60 wt. %.

Similarly, depending on the requirements of the specific application into which the oligomer of structure (VII) will be associated, the viscosity of the accompanying composition may vary significantly. However, in an embodiment, the composition should be configured to possesses an overall viscosity, as measured at a shear rate of 50 $s^{-1}$ and a temperature of 25° C., of less than 40 Pascal Seconds (Pa·s), or less than 30 Pa·s, or less than 15 Pa·s, or less than 10 Pa·s, or less than 1 Pa·s, or from 1 Pa·s to 20 Pa·s, or from 1 Pa·s to 15 Pa·s, or from 1 Pa·s to 10 Pa·s, or from 0.05 to 5 Pa·s, or from 0.05 to 1 Pa·s.

One of the ways in which the viscosity of the composition may be tuned to be suitable is to control the molecular weight of the self-healing oligomer according to structure (VII). Inventors have discovered that by formulating the oligomer according to structure (VII) with a certain number of linking urethane groups, it is possible maintain both the viscosity and/or solubility of the oligomer according to structure (VII) to desired levels. In an embodiment, therefore, the oligomer according to structure (VII) possesses at least three urethane linking groups, or at least four urethane linking groups, or from 3 to 6 urethane linking groups, or from 3 to 5 urethane linking groups, or from 4 to 5 urethane linking groups. If the oligomer according to structure (VII) is configured to possess from 3 to 4 urethane linking groups, the oligomer ideally possesses a $MW_{theo}$ from 500 to 4500, or from 1000 to 4500 g/mol. If, on the other hand, the oligomer according to structure (VII) possesses from 4 to 5 urethane linking groups, the oligomer possesses a $MW_{theo}$ from 500 to 8000, or from 1000 to 8000 g/mol.

In a preferred embodiment, UPy of the oligomer according to structure (VII) is represented by the either of the following structures (VIII-a) or (VIII-b):

(VIII-a)

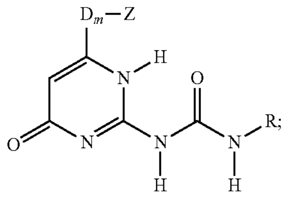

or (VIII-b)

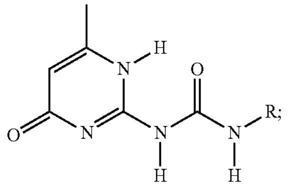

wherein R represents the remaining portion of structure (VII), and D, m, and Z are as defined with respect to structure (VII), above.

In addition to the specified UPy group, the oligomer according to structure (VII) may possess additional self-healing groups. These groups may comprise additional UPy groups, other hydrogen bonding groups, or other self-healing moieties altogether, such as disulfide groups as described elsewhere herein, supra. In an embodiment, X is a multi-hydrogen bonding group or a disulfide group. The aforementioned hydrogen bonding group may also be a UPy group.

According to methods of the present invention, many different oligomer types may be contemplated. Among them include linear or branched structures, those with varying linking groups and/or 3 or more urethane linking groups, and those terminated with acrylate, hydroxyl, amine, cyanate, and/or UPy groups. Two non-limiting examples of such specific potential oligomer structures according to structure (VII) include, without limitation, the following:

(IX)
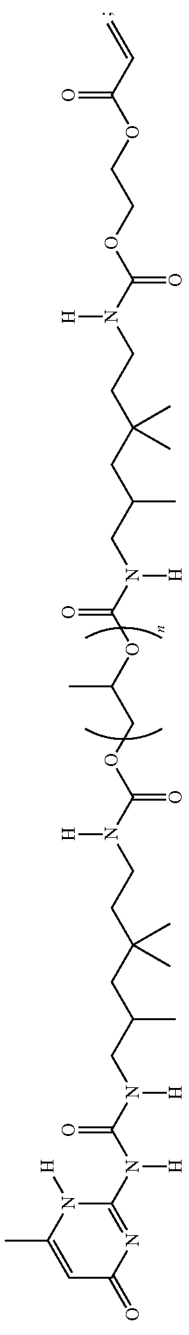
;
(X)
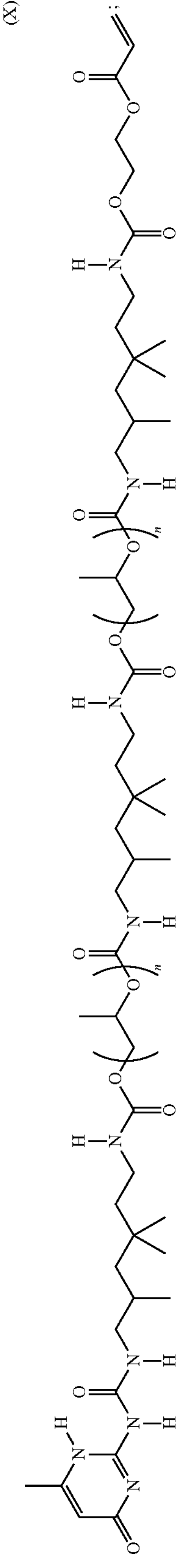
;

wherein n is an integer such that the $MW_{theo}$ of the structure is maintained to between 500 and 8000 g/mol, preferably from 500 to 4500 g/mol.

As can be seen above, the oligomer according to structure (IX) is linear, it possesses 3 linking urethane groups (it being presumed for purposes herein that the urethane group adjacent to the UPy group is associated therewith), and is terminated with an acrylate group on the chain terminus opposite the UPy group. Other variations of this can be contemplated by the person of ordinary skill in the art to which this invention applies in accordance with the guidelines consistent with the oligomers synthesized according to the methods described herein.

Still further examples of specific oligomers according to structure (VII) and in accordance with the methods of the present invention include:

(XI)

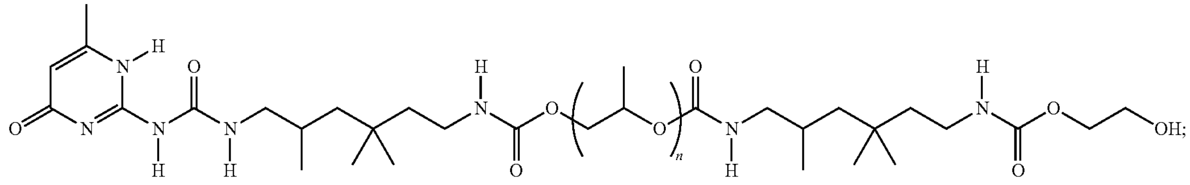

(XII)

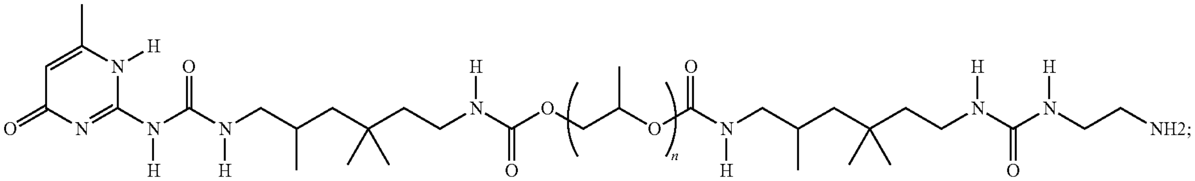

(XIII)

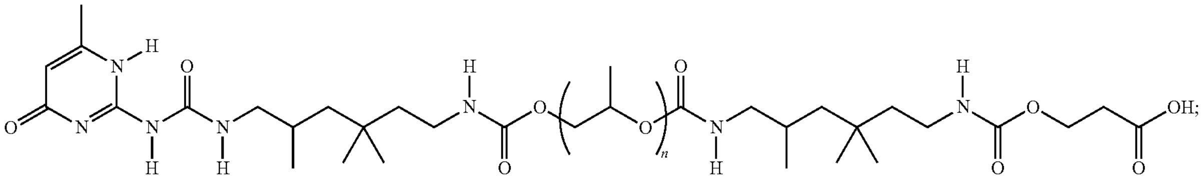

(XIV)

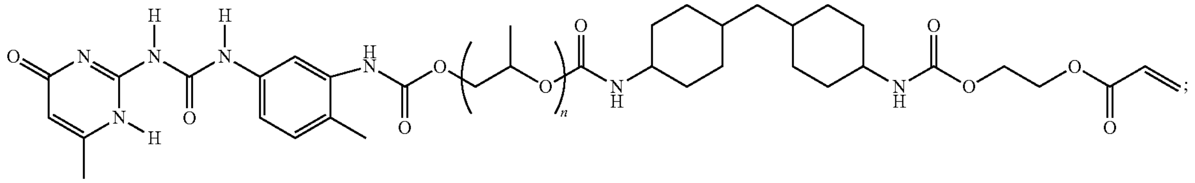

(XV)

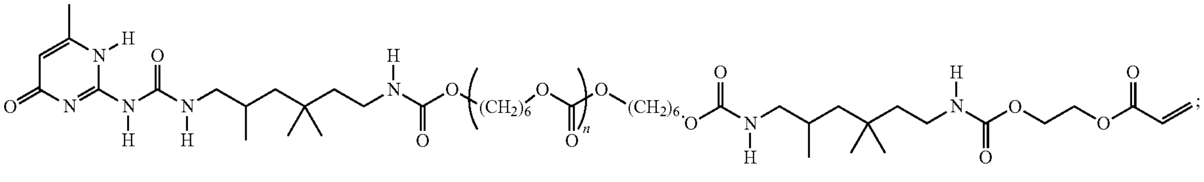

(XVI)

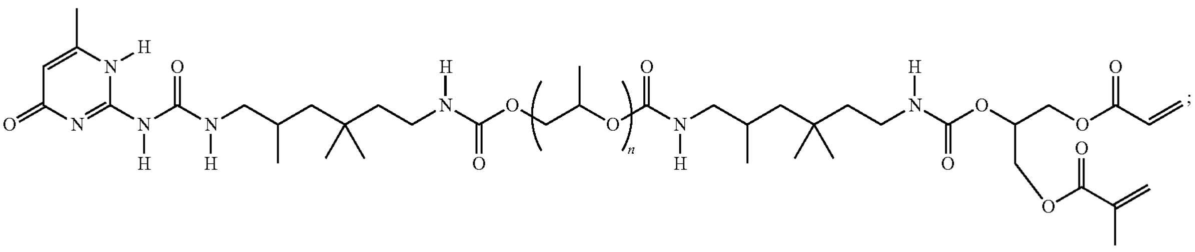

Poly MW 1000 wherein n is an integer such that the $MW_{theo}$ of the structure is maintained to between 500 to 4500 g/mol.

Still further specific examples of oligomers according to structure (VII) include branched structures, such as one or more of the following:

(XVII)
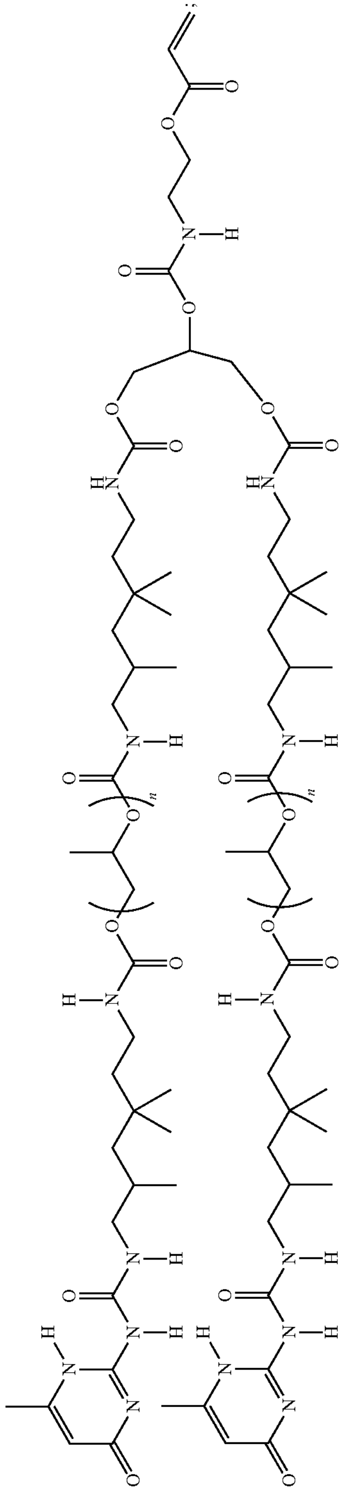
(XVIII)
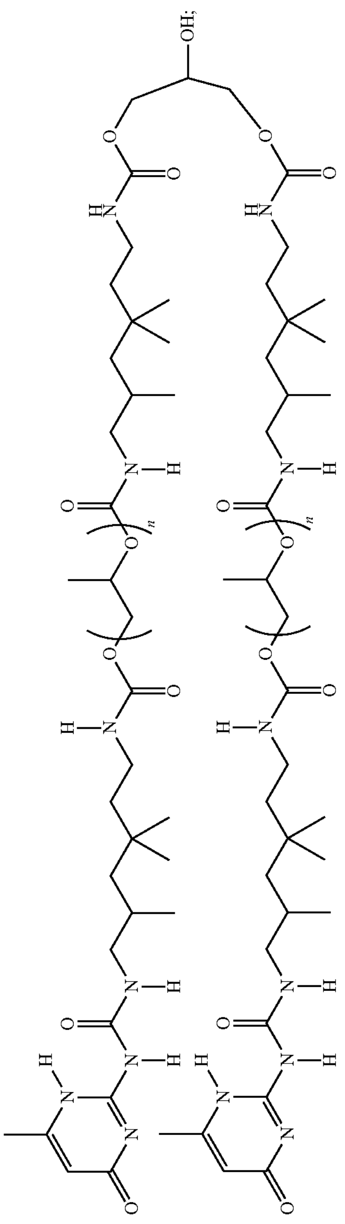
(XIX)
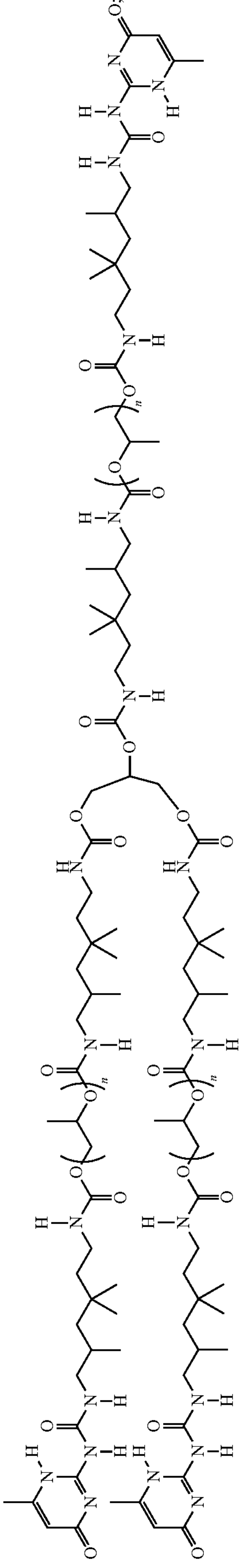

-continued
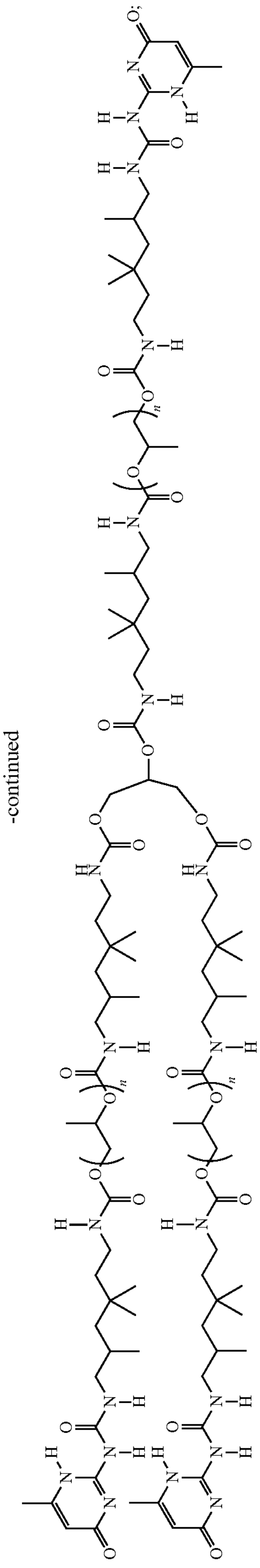
(XX)
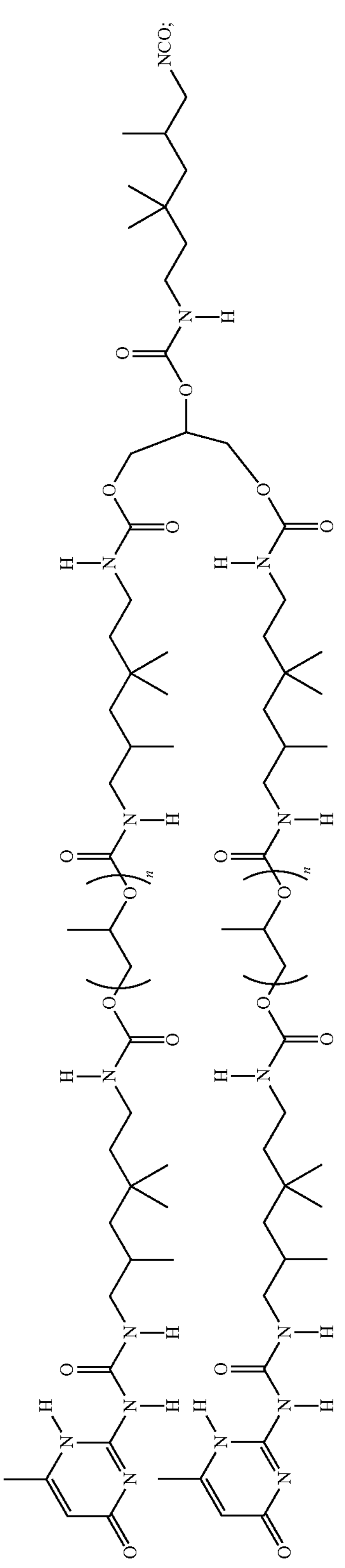
and

-continued
(XXI)
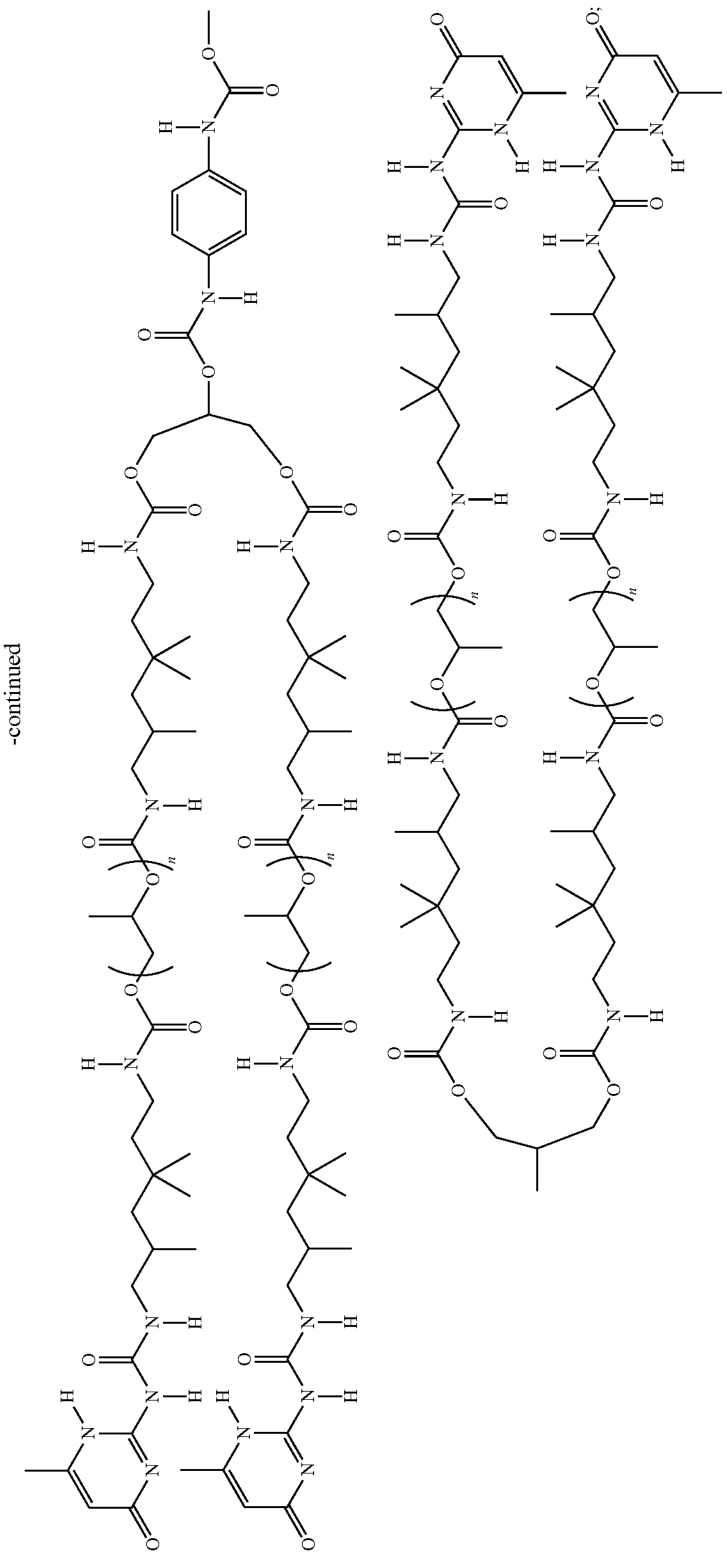

wherein n is an integer such that the $MW_{theo}$ of the structure is maintained to between 500 and 18000 g/mol, or from 500 to 4500 g/mol.

The foregoing example structures (IX) through (XXI) are not intended to be limiting examples. Other variations of the foregoing structures (IX) through (XXI) can be contemplated by the person of ordinary skill in the art to which this invention applies in accordance with the methods of the present invention described elsewhere herein.

In various embodiments, the oligomer according to structure (VII) comprises polymerizable moieties as well. If present, the polymerizable moieties preferably comprise radiation curable moieties, such as vinyl, acryloyloxy, methacryloyloxy and maleimido groups, although other reactive groups such as, without limitation hydroxy, amino, alkynyl, azido, aziridino, silyl, siloxy, silylhydride, thio, isocyanato, protected isocyanato, epoxy, aziridino, carboxylate, F, Cl, Br, I, or similar groups may also be used.

Compositions utilizing the oligomers produced according to the methods described herein may possess self-healing properties and/or stress-relaxation behavior. It is often infeasible to directly measure the magnitude of the self-healing efficacy of any coating in its pre-cured, liquid state. Therefore, it is preferable to determine the self-healing efficacy of the composition by measuring certain physical properties of cured products created therefrom. Specifically, it is possible to assess the self-healing abilities when subjecting a fixed quantity of uncured composition according to a predefined, fixed set of curing conditions, and then by measuring certain physical properties both after initial cure, and then at a subsequent time after having damaged the cured product in some controlled way and allowing a period of time for the cured product to self-heal.

In an embodiment, the self-healing may be observed visually, such as by a qualitative assessment of the disappearance of cavitations over time. Visual detections of cavitations are described in, i.a, U.S. Pat. No. 7,067,564, assigned to DSM IP Assets B.V., which is hereby incorporated by reference in relevant part.

The efficacy of self-healing behavior may also be observed by curing any of the compositions according to any of the embodiments of this first aspect into a 3 mil film by subjecting a composition containing an oligomer produced according to any method described herein to a 1 $J/cm^2$ dose of energy from a radiation source emitting a peak spectral output from 360 nm-400 nm, whereupon when at least one cut damage is formed in the film, said film is configured to heal to some visually detectable degree within a period of not greater than 8 hours, or preferably not greater than 1 hour, or preferably not greater than 5 minutes, or preferably not greater than 1 minute, while the film is maintained at a temperature of 55° C., preferably 25° C., wherein the healing of the film is determined visually via microscope imaging at 40×, or 100× magnification.

In other embodiments, the self-healing characteristics may be determined in other ways, such as by comparing physical properties of a cured product of the coating before and after the cured product has been subjected to a controlled destructive event. A controlled destructive event can be, i.a, an induced cavitation, tear, or cut into the cured product, such as a film, according to a controlled specified procedure. In an embodiment, that controlled destructive event is a cut procedure, whereby a cut is made through a substantially flat film with a substantially rectangular cross section and substantially planar surfaces formed from the coating at 45° in a direction towards a substrate. Such cut may be made at an angle of 45° using a sufficiently sharpened razor, X-Acto® Knife, or similar apparatus having a blade thickness of approximately 0.018 inches or less, beginning from the top face of the cured film and extending downwards to the substrate. The substrate may be constructed of any suitable material such as glass. The cut may be made so as to be substantially perpendicular to the sides of the cured film.

The end-use self-healing behavior of oligomers synthesized according to the methods of the present invention may be demonstrated alternatively via comparison of post-cut and pre-cut physical properties, such as tensile strength. For example, when a composition containing an oligomer produced according to the methods of the present invention is cured into a first film and a second film per a sample preparation method described elsewhere herein, it possesses a pre-cut tensile strength of the first film and a post-cut tensile strength of the second film, wherein the pre-cut tensile strength and post-cut tensile strength are determined after the second film has been subjected to a cut procedure as described elsewhere herein and thereafter is maintained from 12-14 hours at a temperature of about 25° C., or about 55° C.; wherein the post-cut tensile strength is greater than 50%, or greater than 60%, or greater than 85% of the pre-cut tensile strength, or greater than 90%, or greater than 95%.

The aforementioned pre-cut tensile strength and post-cut tensile strength are preferably measured according to ASTM D638, with some modifications to allow for measurement of softer materials when applicable as will be appreciated by the person having ordinary skill in the art to which this invention applies. Specifically, such modifications might include, applying 3 mil thick coatings with talc and cutting them into 0.5 inch width strips before being conditioned at 50±5% relative humidity and 23.0±1.0° C. overnight. The strips may then be loaded onto a mechanical testing machine with a 2 pound load cell, a crosshead speed of 25.4 mm/min, and a gage length of 2.00 inches where they may be extended until break.

EXAMPLES

The example below illustrate various oligomer synthesis methods according to the instant invention. The methods described yield a variety of oligomers which are then formulated into compositions in order to demonstrate certain self-healing and/or stress relaxation behaviors. Table 1 describes the various reagents used to create the compositions used in the present examples. Table 2 describes various further aspects of the oligomers created from the reagents in Table 1, the synthesis for which is described further below. Tables 3A-3D indicate test results for entire formulations created from the components described in Table 1 and the oligomers characterized in Table 2.

TABLE 1

| Formulation Components | | |
|---|---|---|
| Component | Chemical Descriptor (Tradename) | Supplier/ Manufacturer |
| AHMP | 2-amino-4-hydroxy-6-methyl-pyrimidine | Hunan HuaTeng Pharmaceutical |
| TMDI | Trimethylhexamethylene diisocyanate (VESTANAT TMDI) | EVONIK |
| IPDI | Isophorone diisocyanate (Desmodur I) | Covestro |
| PPG-600 | Polypropylene glycol | Sino-Japan |
| PPG-1000 | Polypropylene glycol (Arcol ® PPG-1011) | Covestro |
| PPG-2000 | Polypropylene glycol (Arcol ® PPG-2000) | Covestro |
| Disulfide diol | 2-Hydroxyethyl disulfide | Sigma-Aldrich |
| PDMS-diol 550 | Poly(dimethylsiloxane), hydroxy terminated average Mn ~550, | Sigma-Aldrich |
| PDMS-diol 2500 | Poly(dimethylsiloxane), bis(3-aminopropyl) terminated average Mn ~2,500 | Sigma-Aldrich |
| HDMA | Hexamethylenediamine | Sigma-Aldrich |
| HEA | 2-Hydroxyethyl acrylate | BASF |
| HEMA | 2-Hydroxyethyl methacrylate | LOTTE |
| 2-EHA | 2-Ethylhexyl acrylate | FORMOSA |
| Ethylene glycol | Ethylene glycol | Sigma-Aldrich |
| AMG | 3-(Acryloyloxy)-2-hydroxypropyl methacrylate | Sigma-Aldrich |
| Glycerol | Glycerol | Sigma-Aldrich |
| IEA | 2-isocyanatoethyl acrylate | Sigma-Aldrich |
| 2-ethyl-1-hexylamine | 2-ethyl-1-hexylamine | Sigma-Aldrich |
| EOEOEA | 2-(2-Ethoxyethoxy)ethyl acrylate (AgiSyn ™ 2880) | DSM |
| AgiSyn 2884 | Pentaerythritol acrylate (AgiSyn ™ 2884) | DSM |
| AgiSyn 2830 | Dipentaerythritol acrylate (AgiSyn ™ 2830) | DSM |
| TMPTA | Trimethylolpropane triacrylate (SR351) | Sartomer |
| VC | N-Vinyl caprolactam | BASF |
| TPO | Diphenyl (2,4,6-trimethylbenzoyl) phosphine oxide | Omnirad TPO |
| Irganox 1035 | Thiodiethylene bis[3-(3,5-di-tert-butyl-4-hydroxyphenyl)propionate] (Irganox ® 1035) | BASF |
| Silyl Acrylate | Trimethoxysiliylpropyl acrylate ((3-Acryloxy-propyl) Trimethoxysilane, 96%) | Gelest |
| DBTDL | Dibutylin dilaurate | Evonik |
| BHT | Butylated hydroxytoluene (food grade) | Lanxess, BASF |
| Butyl acetate | Butyl acetate | Sigma-Aldrich |

Synthesis of Oligomers

The oligomers used herein were made resulting in a mixture having a statistical distribution of molecular weight that can be easily recognized by those skilled in the art. The structures in this section, and elsewhere herein, only show the designed averaged, or "ideal" structure, unless otherwise noted.

Specifically to create oligomer 1, a mixture of AHMP (2-amino-4-hydroxy-6-methyl-pyrimidine, 12.5 g, 0.1 mol) and TMDI (42 g, 0.2 mol) was placed in a four-necked flask (500 ml) and purged with nitrogen. The mixture was then stirred at 145° C. for 3.5 hours under nitrogen before an addition of PPG-1000 (100 g, 0.1 mol) and 0.03 g dibutyltin dilaurate (DBTDL, 0.03 g, 0.0475 mmol). The resulting mixture was further stirred at 90° C. for 3 hours and then cooled to 80° C. The resulting reaction mixture was next purged with a gas consisting of air/nitrogen in a 1:3 ratio by volume. Then, DBTDL (0.05 g, 0.079 mmol), BHT, (0.24 g, 1.1 mmol), and 2-hydroxyethyl acrylate (HEA, 11.6 g, 0.1 mol) were added sequentially. While still under the purge of the 1:3 air/nitrogen gaseous mixture, the reaction mixture was further stirred at 80° C. for another 2 hours to yield the final product mixture with an average structure (XXII) shown below as a viscous liquid. The product was then available to be used in subsequent formulation without further purification. The designed structure (XXII) is depicted below:

(XXII)

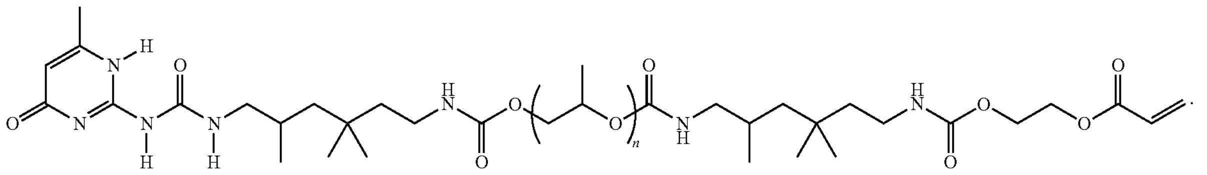

Polyol MW 1000

To create oligomer 2, the procedures resulting in oligomer 1 synthesis described above were followed, except that 2-hydroxyethyl methacrylate (HEMA) was used in place of HEA. The viscous liquid product was a mixture of oligomers with an average structure (XXIII). The product was then available to be used in subsequent formulation without further purification. The designed structure (XXIII) appears below:

(XXIII)

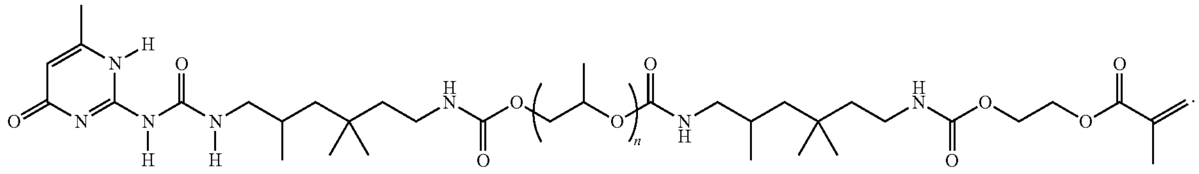

Polyol MW 1000

To create oligomer 3, the procedures resulting in oligomer 1 synthesis described above were followed, except that 2-ethyl-1-hexylamine was used in place of AHMP. The resulting viscous liquid product was provided as a mixture of oligomers without further purification, and having an average structure (XXIV) as shown below:

(XXV)

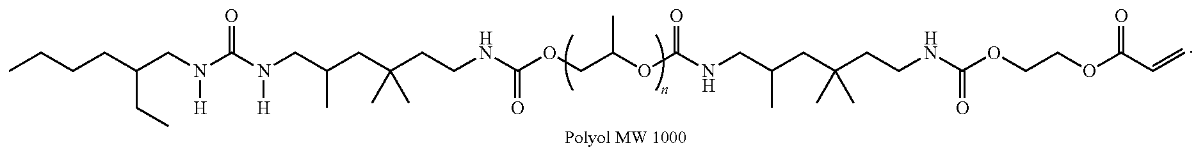

Polyol MW 1000

To create oligomer 4, a mixture of AHMP (12.5 g, 0.1 mol) and IPDI (44.4 g, 0.2 mol) was placed in a four-necked flask (500 ml) and then purged with nitrogen. The resulting mixture was then stirred at 155° C. for 3 hours under nitrogen before the addition of PPG-1000 (100 g, 0.1 mol) and 0.03 g dibutyltin dilaurate (DBTDL, 0.03 g, 0.0475 mmol). The resulting mixture was then stirred at 115° C. for 3 hours and then cooled to 90° C. The reaction mixture was then purged with a gaseous mixture consisting of air and nitrogen in a 1:3 ratio by volume. Then, DBTDL (0.05 g, 0.079 mmol), BHT (0.24 g, 1.1 mmol), and HEA (11.6 g, 0.1 mol) were each added sequentially. While still under the purge of the 1:3 air/nitrogen mixture, the reaction mixture was further stirred at 90° C. for another 2 hours to yield the final product mixture with an average structure (XXV) as a viscous liquid. The product was then available to be used in subsequent formulation without further purification. The designed structure (XXV) appears below:

(XXV)

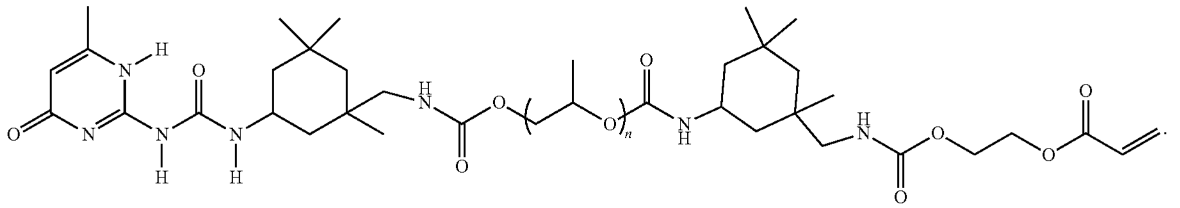

Polyol MW 1000

To create oligomer 5, the procedures resulting in oligomer 4 synthesis described above were followed, except that HEMA was used in place of HEA. The viscous liquid product was a mixture of oligomers with an average structure (XXVI). The product was then available to be used in subsequent formulation without further purification. The designed structure (XXVI) appears below:

(XXVI)

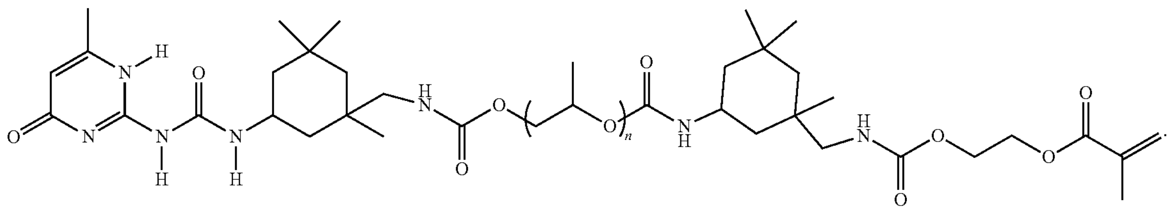

Polyol MW 1000

To create oligomer 6, a mixture of AHMP (8.75 g, 0.07 mol) and IPDI (44.4 g, 0.2 mol) was placed in a four-necked flask (250 ml) and then purged with nitrogen. The mixture was then stirred at 155° C. for 3 hours under nitrogen, after which an addition of PPG-1000 (100 g, 0.1 mol) and 0.03 g DBTDL (0.03 g, 0.0475 mmol) was made. The resulting mixture was stirred at 115° C. for 3 hours and then cooled to 90° C. The reaction mixture was then purged with a gaseous mixture of air and nitrogen in a 1:3 ratio by volume. Next, DBTDL (0.05 g, 0.079 mmol), BHT (0.24 g, 1.1 mmol), and HEA (15.08 g, 0.13 mol) were added sequentially. While still under the purge of the 1:3 air/nitrogen mixture, the reaction mixture was subsequently stirred at 90° C. for another 2 hours to yield the final oligomer mixture with an average structure (XXVII) as drawn below as a viscous liquid. The product was then available to be used in subsequent formulation without further purification:

(XXVII)

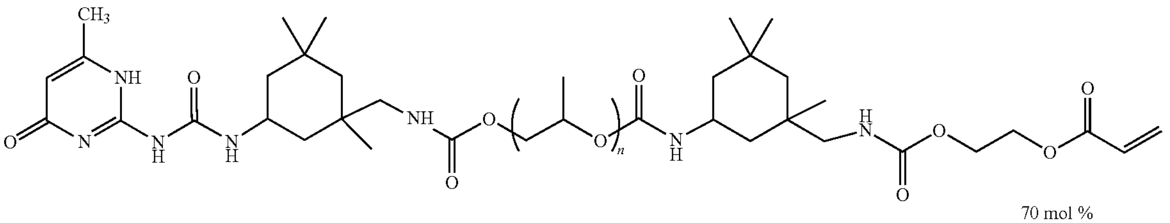

70 mol %

Polyol MW 1000

+

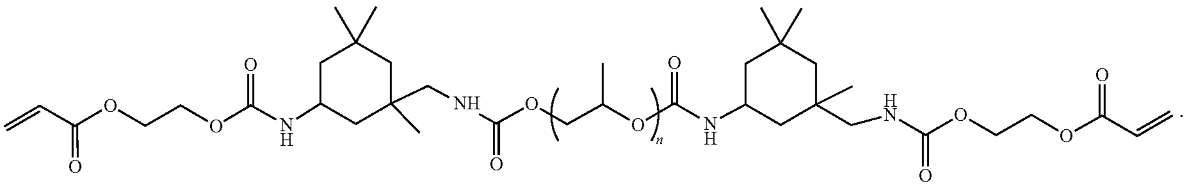

30 mol %

Polyol MW 1000

To create oligomer 7, the procedure used to synthesize oligomer 6 as described above was followed except that 2-ethyl-1-hexylamine was used in place of AHMP. The resulting viscous liquid product was provided as a mixture of oligomers without further purification having an average structure (XXVIII) as shown below:

(XXVIII)

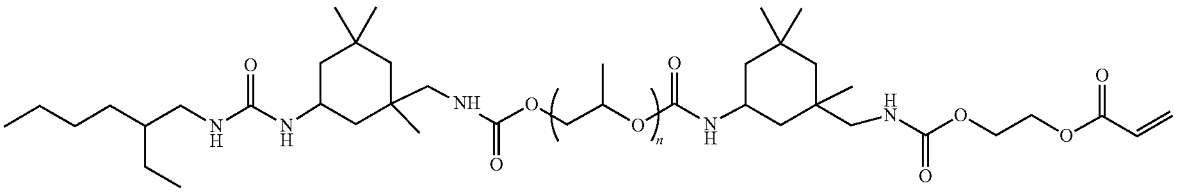

70 mol %

Polyol MW 1000

+

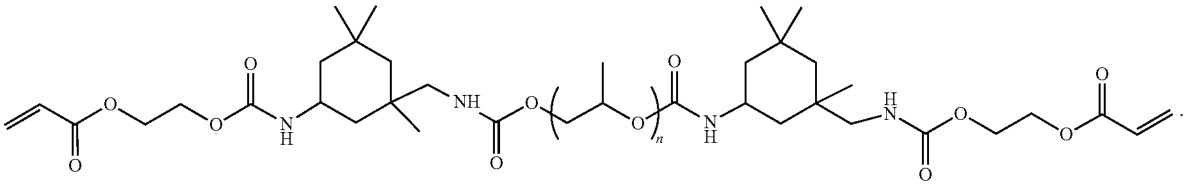

30 mol %

Polyol MW 1000

To create oligomer 8, the procedures resulting in oligomer 1 synthesis described above were followed, except that PPG-600 was used in place of PPG-1000. The viscous liquid product was a mixture of oligomers with an average structure (XXIX). The product was then available to be used in subsequent formulation without further purification. The designed structure (XXIX) appears below:

(XXIX)

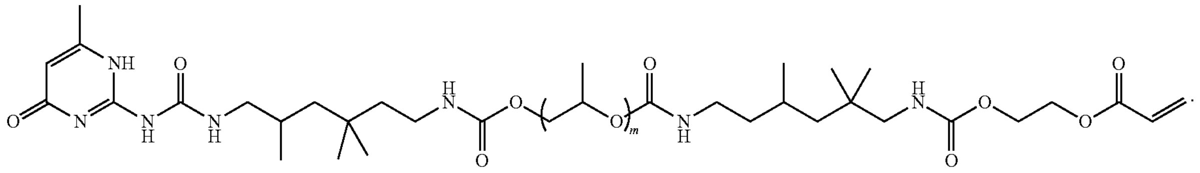

Polyol MW 600

To create oligomer 9, the procedures resulting in oligomer 1 synthesis described above were followed, except that PPG-2000 was used in place of PPG-1000. The viscous liquid product was a mixture of oligomers with an average structure (XXX). The product was then available to be used in subsequent formulation without further purification. The designed structure (XXX) appears below:

(XXX)

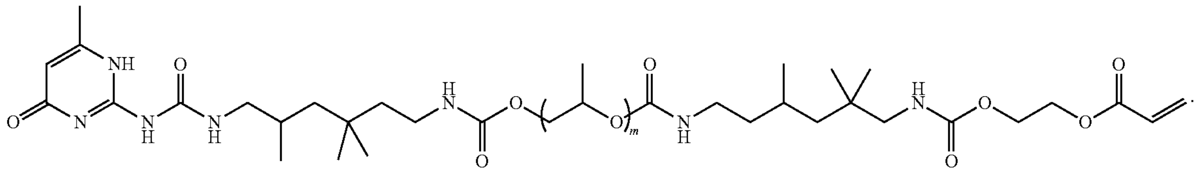

Polyol MW 2000

To create oligomer 10, a mixture of AHMP (15.2 g, 0.12 mol) and TMDI (51.58 g, 0.24 mol) was placed in a four-necked flask (250 ml) and purged with nitrogen. The mixture was then stirred at 145° C. for 3.5 hours under nitrogen before an addition of disulfide diol (2-hydroxyethyl disulfide, 18.82 g, 0.12 mol), DBTDL (0.02 g, 0.0317 mmol) and butyl acetate (40 g). The resulting mixture was further stirred at 100° C. for 3 hours and then cooled to 90° C. The resulting reaction mixture was next purged with a gas consisting of air/nitrogen in a 1:3 ratio by volume. Then, DBTDL (0.03 g, 0.0475 mmol), BHT (0.15 g, 0.68 mmol), and HEA (14.2 g, 0.12 mol) were added sequentially. While still under the purge of the 1:3 air/nitrogen gaseous mixture, the reaction mixture was further stirred at 90° C. for another 2 hours to yield the final product mixture with an average structure (XXXI) shown below as a viscous liquid. The product was then available to be used in subsequent formulation without further purification. The designed structure (XXXI) is depicted below:

(XXXI)

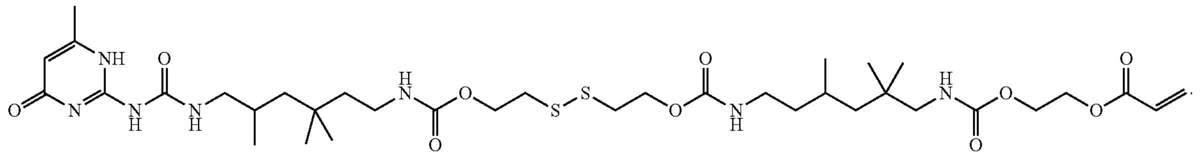

To create oligomer 11, the procedures resulting in oligomer 1 synthesis described above were followed, except that 3-(acryloyloxy)-2-hydroxypropyl methacrylate (AMG) was used in place of HEA. The viscous liquid product was a mixture of oligomers with an average structure (XXXII). The product was then available to be used in subsequent formulation without further purification. The designed structure (XXXII) appears below:

(XXXII)

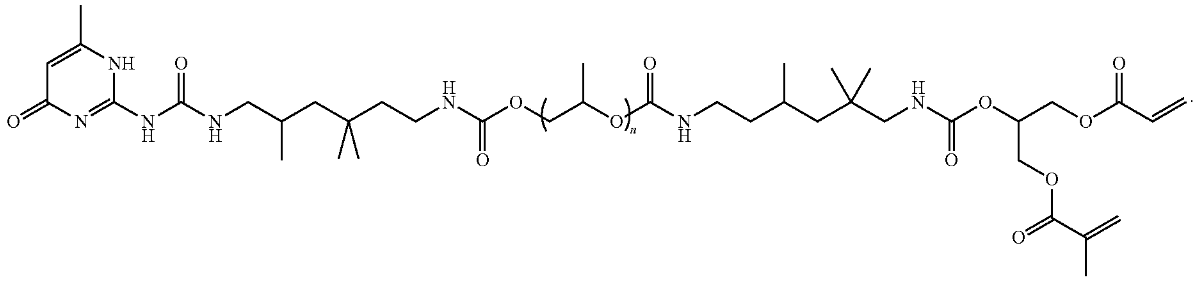

Polyol MW 1000

To create oligomer 12, a mixture of AHMP (7.42 g, 0.059 mol) and TMDI (25.19 g, 0.12 mol) was placed in a four-necked flask (250 ml) and purged with nitrogen. The mixture was then stirred at 145° C. for 3.5 hours under nitrogen before an addition of PPG-1000 (59.8 g, 0.0598 mol) and DBTDL (0.02 g, 0.0317 mmol). The resulting mixture was further stirred at 100° C. for 3 hours and then cooled to 90° C. The resulting reaction mixture was next purged with a gas consisting of air/nitrogen in a 1:3 ratio by volume. Then, DBTDL (0.03 g, 0.0475 mmol), BHT (0.15 g, 0.68 mmol), IEA (2-isocyanatoethyl acrylate, 4.64 g, 0.03 mol) and glycerol (2.75 g, 0.03 mol) were added sequentially. While still under the purge of the 1:3 air/nitrogen gaseous mixture, the reaction mixture was further stirred at 90° C. for another 2 hours to yield the final product mixture with an average structure (XXXIII) shown below as a viscous liquid. The product was then available to be used in subsequent formulation without further purification. The designed structure (XXXIII) 15 depicted below:

(XXXIII)

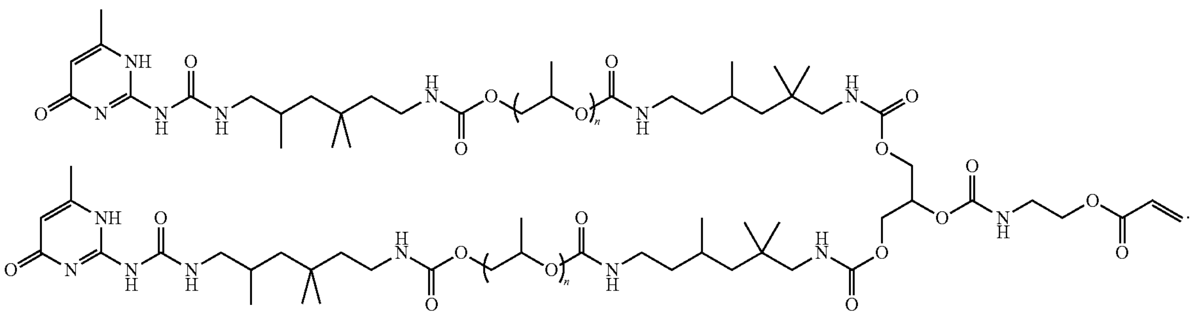

Polyol MW 1000

To create oligomer 13, a mixture of AHMP (7.71 g, 0.062 mol) and TMDI (26.16 g, 0.124 mol) was placed in a four-necked flask (250 ml) and purged with nitrogen. The mixture was then stirred at 145° C. for 3.5 hours under nitrogen before an addition of PPG-1000 (62.1 g, 0.062 mol) and DBTDL (0.02 g, 0.0317 mmol). The resulting mixture was further stirred at 100° C. for 3 hours and then cooled to 90° C. The resulting reaction mixture was next purged with a gas consisting of air/nitrogen in a 1:3 ratio by volume. Then, DBTDL (0.03 g, 0.0475 mmol), BHT (0.15 g, 0.68 mmol), and ethylene glycol (3.83 g, 0.062 mol) were added sequentially. While still under the purge of the 1:3 air/nitrogen gaseous mixture, the reaction mixture was further stirred at 90° C. for another 2 hours to yield the final product mixture with an average structure (XXXIV) shown below as a viscous liquid. The product was then available to be used in subsequent formulation without further purification. The designed structure (XXXIV) is depicted below:

(XXXIV)

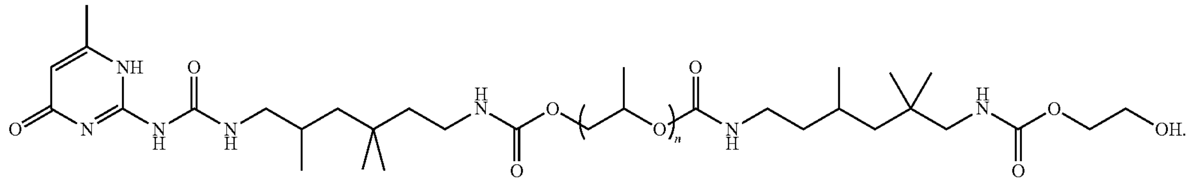

Polyol MW 1000

To create oligomer 14, a mixture of AHMP (7.58 g, 0.06 mol) and TMDI (25.68 g, 0.12 mol) was placed in a four-necked flask (250 ml) and purged with nitrogen. The mixture was then stirred at 145° C. for 3.5 hours under nitrogen before an addition of PPG-1000 (57.8 g, 0.0578 mol), PDMS-diol 550 (hydroxy-terminated poly(dimethylsiloxane), Mn=550, 1.67 g, 0.003 mol) and DBTDL (0.02 g, 0.0317 mmol). The resulting mixture was further stirred at 100° C. for 3 hours and then cooled to 90° C. The resulting reaction mixture was next purged with a gas consisting of air/nitrogen in a 1:3 ratio by volume. Then, DBTDL (0.03 g, 0.0475 mmol), BHT (0.15 g, 0.68 mmol), and HEA (7.07 g, 0.06 mol) were added sequentially. While still under the purge of the 1:3 air/nitrogen gaseous mixture, the reaction mixture was further stirred at 90° C. for another 2 hours to yield the final oligomer mixture with an average structure (XXXV) shown below as a viscous liquid. The product was then available to be used in subsequent formulation without further purification. The designed structure (XXXV) is depicted below:

(XXXV)

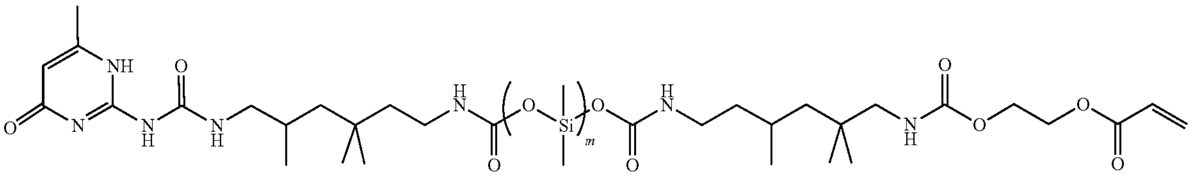

Hydroxy terminated poly(dimethylsiloxane) MW 550 5 mol %

+

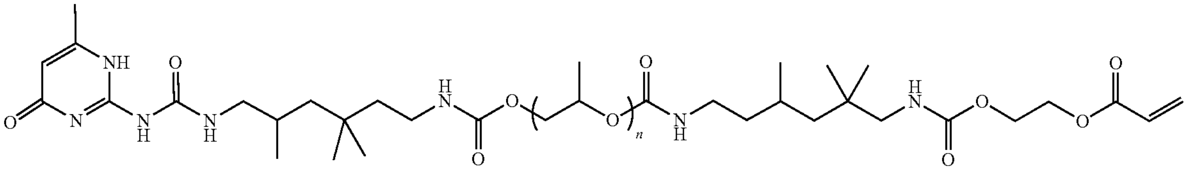

Polyol MW 1000 95 mol %

To create oligomer 15, the procedures resulting in oligomer 14 synthesis described above were followed, except that PDMS-diol 2500 (bis(3-aminopropyl) terminated poly (dimethylsiloxane), Mn=2500), was used in place of PDMS-diol 550. The viscous liquid product was a mixture of oligomers with an average structure (XXXVI). The product was then available to be used in subsequent formulation without further purification. The designed structure (XXXVI) appears below:

(XXXVI)

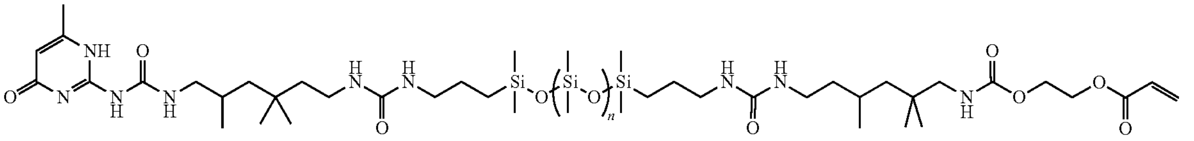

Bis(3-aminopropyl) terminated poly(dimethylsiloxane) MW 2500 5 mol %

+

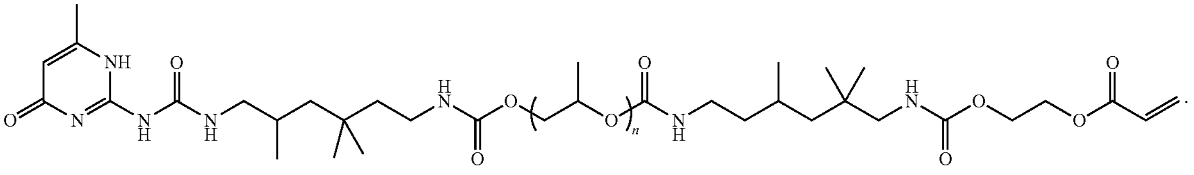

Polyol MW 1000 95 mol %

To create oligomer 16, a mixture of AHMP (5.89 g, 0.047 mol) and TMDI (19.95 g, 0.094 mol) was placed in a four-necked flask (250 ml) and purged with nitrogen. The mixture was then stirred at 145° C. for 3.5 hours under nitrogen before an addition of PPG-1000 (33.05 g, 0.033 mol), PDMS-diol 2500 (35.43 g, 0.014 mol) DBTDL (0.02 g, 0.0317 mmol). The resulting mixture was further stirred at 100° C. for 3 hours and then cooled to 90° C. The resulting reaction mixture was next purged with a gas consisting of air/nitrogen in a 1:3 ratio by volume. Then, DBTDL (0.03 g, 0.0475 mmol), BHT (0.15 g, 0.68 mmol), and HEA (5.48 g, 0.047 mol) were added sequentially. While still under the purge of the 1:3 air/nitrogen gaseous mixture, the reaction mixture was further stirred at 90° C. for another 2 hours to yield the final oligomer mixture with an average structure (XXXVII) shown below as a viscous liquid. The product was then available to be used in subsequent formulation without further purification. The designed structure (XXXVII) is depicted below:

(XXXVII)

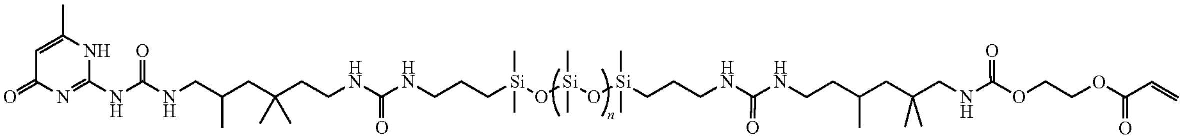

Bis(3-aminopropyl) terminated poly(dimethylsiloxane) MW 2500 30 mol %

+

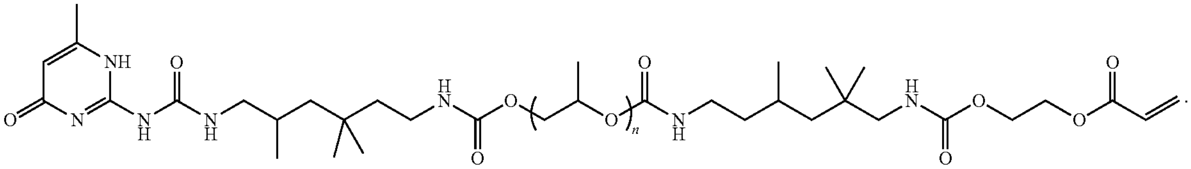

Polyol MW 1000 70 mol %

To create oligomer 17, a mixture of 2-ethyl-1-hexylamine (15.66 g, 0.121 mol) and TMDI (51.29 g, 0.243 mol) was placed in a four-necked flask (250 ml) and purged with nitrogen. The mixture was then stirred at 125-145° C. for 3.5 hours under nitrogen before an addition of disulfide diol (18.77 g, 0.121 mol) and DBTDL (0.02 g, 0.0317 mmol). The resulting mixture was further stirred at 100° C. for 3 hours and then cooled to 90° C. The resulting reaction mixture was next purged with a gas consisting of air/nitrogen in a 1:3 ratio by volume. Then, DBTDL (0.03 g, 0.0475 mmol), BHT (0.15 g, 0.68 mmol), and HEA (14.08 g, 0.121 mol) were added sequentially. While still under the purge of the 1:3 air/nitrogen gaseous mixture, the reaction mixture was further stirred at 90° C. for another 2 hours to yield the final product mixture with an average structure (XXXVIII) shown below as a viscous liquid. The product was then available to be used in subsequent formulation without further purification. The designed structure (XXXVIII) is depicted below:

(XXXVIII)

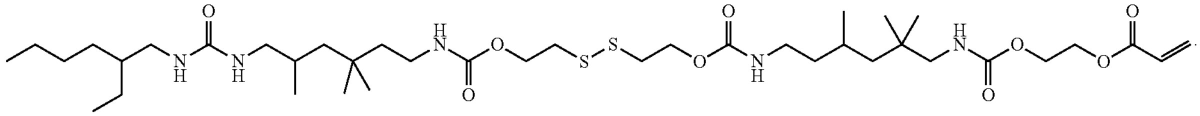

The specific oligomer reactants described above are depicted in Table 2 below.

TABLE 2

Reactants for Oligomers 1-17 (in mol ratio)

| Reactant | Molar Mass (g/mol) | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| AHMP | 125.131 | 1 | 1 | | 1 | 1 | 0.7 | | 1 | 1 | 1 | 1 | 1 | 1 | 1 | 1 | 1 | |
| TMDI | 210.27 | 2 | 2 | 2 | | | | | 2 | 2 | 2 | 2 | 2 | 2 | 2 | 2 | 2 | 2 |
| IPDI | 222.3 | | | | 2 | 2 | 2 | 2 | | | | | | | | | | |
| PPG-600 | ~600 | | | | | | | | 1 | | | | | | | | | |
| PPG-1000 | ~1000 | 1 | 1 | 1 | 1 | 1 | 1 | 1 | | | | 1 | 1 | 1 | 0.95 | 0.95 | 0.7 | |
| PPG-2000 | ~2000 | | | | | | | | | 1 | | | | | | | | |
| Disulfide diol | 154.25 | | | | | | | | | | 1 | | | | | | | 1 |
| PDMS-diol 550 | ~550 | | | | | | | | | | | | | | .05 | | | |
| PDMS-diol 2500 | ~2500 | | | | | | | | | | | | | | | 0.05 | 0.3 | |
| HDMA | 116.21 | | | | | | | | | | | | | | | | | |
| HEA | 116.12 | 1 | | 1 | 1 | | 1.3 | 1.3 | 1 | 1 | 1 | | | | 1 | 1 | 1 | 1 |
| HEMA | 130.143 | | 1 | | | 1 | | | | | | | | | | | | |
| Ethylene glycol | 62.07 | | | | | | | | | | | | | 1 | | | | |
| AMG | 214.22 | | | | | | | | | | | 1 | | | | | | |
| IEA | 141.13 | | | | | | | | | | | | 0.5 | | | | | |

TABLE 2-continued

| Reactants for Oligomers 1-17 (in mol ratio) | | | | | | | | | | | | | | | | | | |
|---|---|---|---|---|---|---|---|---|---|---|---|---|---|---|---|---|---|---|
| Reactant | Molar Mass (g/mol) | 1 | 2 | 3 | 4 | 5 | 6 | 7 | 8 | 9 | 10 | 11 | 12 | 13 | 14 | 15 | 16 | 17 |
| Glycerol | 92.09 | | | | | | | | | | | | 0.5 | | | | | |
| 2-ethyl-1-hexylamine | 129.24 | | | 1 | | | | 0.7 | | | | | | | | | | 1 |

The synthesis of the oligomers above which may be considered as part of a self-healing component are expected to be useful in a composition for which self-healing behavior would be beneficial. To exhibit this further, a subset of these oligomers was used to create a variety of compositions, which were formulated and evaluated as described below. Such compositions below are formulated alongside appropriate controls utilizing select oligomers described above which do not contain self-healing groups and therefore have not been synthesized according to the instant invention.

Formulations 1-22

Each of the formulations described in Tables 3A-D was prepared by mixing a 100 g sample in a 100 ml mixing cup suitable for use with a SpeedMixer™. Specifically, the oligomer and monomer components were mixed in addition to the other components as specified in Tables 3A-3D below. The mixture was then premixed by hand to ensure the oligomer was well-mixed into the monomers used, after which the cup was closed and mixed in a SpeedMixer™ DAC150FVZ at 3500 rpm for 3 minutes. After this, the mixing operation was stopped, and the resulting mixture was transferred to a suitable receptacle and then heated to 75° C. in an oven and maintained at this temperature for about 1 hour to ensure complete dissolution of all components. The sample was then removed from the oven and mixed again for 3 additional minutes in the SpeedMixer again via the same method, after which the silyl acrylate was added, resulting in 100 g total. Finally, the mixture was mixed again for an additional 3 minutes in the SpeedMixer again via the same method.

These formulations were next characterized according to their respective content of UPy and (meth)acrylate groups per the methodology described below. Then, all formulations were tested according to the methods described below to determine their tensile strength, elongation percentage, segment modulus, toughness, viscosity, self-healing ability on film at multiple temperatures, and stress-relaxation %, respectively. Unless otherwise shown, values for UPy equivalents, (meth)acrylate equivalents, and disulfide equivalents are presented herein as rounded to three decimal places. Segment modulus and toughness values, meanwhile, have been rounded to 2 decimal places, with tensile strength presented as rounded to a single decimal place. Viscosity is presented to the nearest 1 centipoise unit. Film healing results are reported as a qualitative, binary "Yes" or "No" value. Finally, stress relaxation and film mechanical recovery values are presented as rounded to the nearest 1%. Values for each of these measured characteristics are reported in Tables 3A-3D below.

UPy Equivalents

The "UPy Equivalents" for a given composition was determined by first calculating the amount of moles of UPy groups in each UPy-containing component (Z) in accordance with the following expression:

$$Z = \frac{N \times Wt}{MM}$$

wherein Wt=the amount by weight of the respective component Z relative to 100 g of the total associated composition; N=the number of 2-ureido-4-pyrimidinone groups present in one molecule of component Z; and MM is the theoretical molecular mass of component Z (in g/mol). The theoretical molecular mass values for the reactants used in creating the oligomers (including the UPy-containing oligomers) of the formulations herein are reported in Table 2.

Then, the value for UPy Equivalents for the entire composition is calculated by adding up the values of moles of UPy groups for each UPy-containing component according to the following expression:

$$\sum_{i=1}^{n} Z_i = Z_1 + Z_2 + Z_3 + \ldots + Z_n$$

where n represents the number of UPy-containing components present in the formulation.

The values for UPy Equivalents may optionally be expressed as "UPy Milliequivalents" by multiplying the summed value by 1000, although unless specifically noted, the values herein are not reported in this fashion. For clarity, where "equivalents" or "milliequivalents" is specified herein, unless otherwise noted, the value is to be interpreted in reference to 100 g of the composition with which it is associated. UPy Equivalents values for each formulation is presented in Table 3A below.

It should be noted that if the complete recipe of a composition is not known ex ante, the equivalents of self-healing moieties may be determined analytically via any suitable method as will be appreciated by the skilled artisan to which this invention applies, such as via size exclusion chromatography (SEC), infrared spectroscopy, HPLC, MALDI-TOF mass spectrometry, or nuclear magnetic resonance (NMR) methods.

(Meth)Acrylate Equivalents and Disulfide Equivalents

Values for (meth)acrylate equivalents and disulfide equivalents are determined via the same method as that prescribed for "UPy Equivalents" above, except for the fact that instead of assessing UPy groups or UPy-containing components, now (meth)acrylate groups (or disulfide groups as applicable) are counted. It is contemplated that if a given composition possesses both acrylate groups and methacrylate groups, the values will be summed together for purposes herein.

Viscosity

The viscosity was measured using Anton Paar Rheolab QC. The instrument was set up for the conventional Z3 system, which was used. For each measurement, samples in the amount of 14.7±0.2 g were loaded into a disposable aluminum cup. The sample in the cup was examined and if upon visual inspection it was determined to contain bubbles, the sample and cup were either subjected to centrifugation or allowed to sit long enough so that the bubbles would escape from the bulk of the liquid. Bubbles appearing at the top surface of the liquid were considered to be acceptable.

Next, the bob was gently loaded into the liquid in the measuring cup, after which the cup and bob were installed in the instrument. The sample temperature was allowed to equilibrate with the temperature of the circulating liquid (which itself was maintained at 25 degrees Celsius) by waiting five minutes. Then, the rotational speed was set to a certain value in order to produce the desired shear rate of 50 $sec^{-1}$.

After this, measurement readings were obtained. The instrument panel displayed a viscosity value, and if the viscosity value varied only slightly (less than 2% relative variation) for 15 seconds, the measurement was ceased. If greater than 2% relative variation was observed, the sample was allowed to equilibrate for an additional 5 minutes whereupon testing was resumed. If, upon the additional equilibration period, the sample variability remained, the shear rate would be modified according to well-known methods in the art to which this invention applies to more accurately capture the sample's viscous properties. The results reported represented the average viscosity values of three separate test samples. The values were recorded as expressed in millipascal seconds (mPa·s) and a shear rate of 50 $s^{-1}$ unless otherwise specified. The results for each example are reported in Table 3A-3D below, as appropriate.

Film Sample Preparation

To create films such that various physical properties could be tested, each sample was cured under a constant flow of nitrogen gas with a 1 J/$cm^2$ UV-dose of Conveyor Fusion Unit Model DRS-10/12 QN, 600 W UV-lamp system having as lamps 1600M radiator (600 W/inch which equals 240 W/cm, and thus, in total 600 W) fitted with R500 reflector, one with a H bulb and one with a D bulb UV lamp, of which the D-bulb was used to cure the samples. The UV-dose was then measured with an International Light IL390 radiometer.

Then, individual test strips having a width of approximately 1.27 cm (0.5 inches±1/32") and a length of approximately 12.7 cm (5 inches±1/8") were then cut from the film. The exact thickness of each specimen was measured with a calibrated micrometer.

Tensile Strength, Elongation, Segment Modulus, and Toughness Test Method

The method for determining segment modulus as used herein is found in EP2089333B1, assigned to DSM IP Assets B.V., the relevant portions of which are hereby incorporated by reference in their entirety. The tensile properties (tensile strength, percent elongation at break, and segment modulus) were determined with an MTS Criterion™ Model 43.104 with respect to test strips of a cured film of each sample having a 3 mil thickness as prepared per the "Film Sample Preparation" procedure described above.

Due to these relatively soft coatings (e.g., those with a modulus of less than about 10 MPa), the coating was drawn down and cured on a glass plate and the individual specimens cut from the glass plate with a scalpel after applying a thin layer of talc. A 0.9 kg (2-1b) load cell was used in an Instron 4442 Tensile Tester, and the modulus was calculated at 2.5% elongation with a least-squares fit of the stress-strain plot. Cured films were conditioned at 23.0±0.1° C. and 50.0±0.5% relative humidity for 16 to 24 hours prior to testing.

For testing specimens, the gage length was 5.1 cm (2-inches) and the crosshead speed was 25.4 mm/min. All testing was performed at a temperature of 23.0±0.1° C. and a relative humidity of 50.0±0.5%. All measurements were determined from the average of at least 6 test specimens.

Values for Tensile Strength were determined as the highest stress born by the sample before break. Values for toughness were determined as the total area under the stress-strain curve.

Film Healing Test

First, with respect to each formulation as shown in the tables below, test strips of a 3 mil thick cured film were prepared per the "Film Sample Preparation" procedure as described above. Then, each test strip was cut with an appropriately-sharpened (i.e. like new) scalpel having a blade thickness of less than or equal to 0.018 inches under a microscope objective (40× magnification) to view cut self-healing in real time. Healing was then assessed visually after each sample was maintained at room temperature (25° C.) for 5 minutes. Qualitative assessments of healing in this fashion were reported across the row headed by the phrase "Film Healing, 25° C."; if any observable amount of healing occurred under these conditions, the sample was graded with "YES"; if no observable healing had occurred, it was graded "NO" as reported in Tables 3A-3D below.

Then, each sample which had not already been graded with a "YES" was further heated to 55° C. using a Linkham LTS120 Temperature stage under a microscope objective (at 40× magnification) for a further visual assessment. Healing was again qualitatively determined visually after maintaining each sample at a temperature of 55° C. for 5 minutes. The same criteria for determining "YES" and "NO" were applied to the samples in this instance as with respect to the room temperature healing test. The results are reported in Table 3A, 3B, and 3D as appropriate under the row headed by the phrase "Film Healing, 55° C.", with the further understanding that samples which exhibited self-healing at room temperature were automatically graded with a "YES" designation under the 55° C. condition test (without measurement), it being understood that the healing behavior at 55° C. exceeds that at room temperature.

Stress Relaxation Test

First, with respect to each formulation as indicated in the tables below, test strips of a 3 mil thick cured film were prepared per the "Film Sample Preparation" procedure as described above. After this, the strips were conditioned at 50% relative humidity and 23° C. overnight. The exact thickness was measured with a calibrated micrometer, and the exact width was measured via optical microscopy at 4× magnification. Samples were tested in a Dynamic Mechanical Analyzer (DMA) in a "wide strip" geometry with a 0.79 inch testing length and by mounting 1 gram of pretension held by screws and secured with a torque driver to 20 cN·m. The samples were tested isothermally at room temperature and held at the specified strain (2% for Table 3A and Table 3D; 1.5% for Tables 3B and 3C) for 100 seconds while measuring stress with a sampling rate of 8 points/sec. Samples were run in duplicate and averaged. Values for the total percentage of stress reduction from 1 second to 10 seconds are reported in Tables 3A-3D below.

Film Mechanical Recovery Test

First, with respect to each formulation as indicated in Table 3D below, two 3 mil thick cured films were prepared per the "Film Sample Preparation" procedure as described above, with the exception that the test strips were not cut immediately from the films. For the avoidance of doubt, for each test, both films were prepared not only from the same recipe, but also the same actual batch of the prepared starting material. One film was then cut in accordance with the procedure outlined in the "Film Healing Test" described above. The other film was not cut.

Both films were left to heal overnight (for 12-14 hours) at 50% relative humidity and 23° C. overnight or in an oven at 55° C. (as specified in Table 3D). The cut films were not otherwise handled or altered in any way after the cut was created.

After completion of the 12-14 hour healing period, the films were cut into test strips per the "Film Sample Preparation" procedure as described above. The tensile strength of resultant strips from the uncut film was then measured per the method as described above, with the value recorded (referred to herein as "pre-cut tensile strength"). The tensile strength of the cut test strip was then determined, again in accordance with the procedure as outlined elsewhere herein, above. If the sample had been left to heal at 55° C., it was allowed to equilibrate to room temperature (over the course of about 30 minutes) first prior to taking the tensile strength measurement. The value obtained was then recorded (referred to herein as "post-cut tensile strength").

The Film Mechanical Recovery values reported in Table 3D below represent the measured post-cut tensile strength value divided by the measured pre-cut tensile strength value for each composition, expressed as a percentage to the nearest whole 1 percent. Where the sample did not exhibit any healing and no post-cut tensile strength could be measured, the value was reported simply as 0%.

TABLE 3A

| Formulations 1-10. All amounts listed in parts by weight. | | | | | | | | | | |
|---|---|---|---|---|---|---|---|---|---|---|
| Formulation | 1 | 2 | 3 | 4 | 5 | 6 | 7 | 8 | 9 | 10 |
| Oligomer 1 | 65 | | 70 | | 65 | | | | | |
| Oligomer 3 | | 65 | | 70 | | 65 | | | | |
| Oligomer 6 | | | | | | | 85 | | 70 | |
| Oligomer 7 | | | | | | | | 85 | | 70 |
| EOEOEA | 27.2 | 27.2 | 22.2 | 22.2 | 25.7 | 25.7 | | | 22.2 | 22.2 |
| HEA | | | | | | | 7.2 | 7.2 | | |
| TMPTA | 0.5 | 0.5 | 0.5 | 0.5 | 2 | 2 | 0.5 | 0.5 | 0.5 | 0.5 |
| VC | 5 | 5 | 5 | 5 | 5 | 5 | 5 | 5 | 5 | 5 |
| TPO | 1.2 | 1.2 | 1.2 | 1.2 | 1.2 | 1.2 | 1.2 | 1.2 | 1.2 | 1.2 |
| Irganox 1035 | 0.6 | 0.6 | 0.6 | 0.6 | 0.6 | 0.6 | 0.6 | 0.6 | 0.6 | 0.6 |
| Silyl Acrylate | 0.5 | 0.5 | 0.5 | 0.5 | 0.5 | 0.5 | 0.5 | 0.5 | 0.5 | 0.5 |
| TOTALS | 100 | 100 | 100 | 100 | 100 | 100 | 100 | 100 | 100 | 100 |
| UPy Equivalents | 0.039 | 0 | 0.042 | 0 | 0.039 | 0 | 0.039 | 0 | 0.032 | 0 |
| (Meth)Acrylate Equivalents | 0.227 | 0.227 | 0.203 | 0.203 | 0.234 | 0.234 | 0.162 | 0.162 | 0.208 | 0.208 |
| Tensile Strength (MPa) | 0.3 | 0.1 | 0.3 | 0.1 | 0.3 | 0.1 | 1.3 | 1.4 | 0.5 | 0.4 |
| Elongation (%) | 132 | 60 | 128 | 48 | 67 | 33 | 130 | 130 | 75 | 52 |
| Segment Modulus (MPa) | 0.71 | 0.27 | 0.77 | 0.27 | 1.0 | 0.44 | 3.99 | 1.79 | 1.34 | 1.13 |
| Toughness ($N*mm/mm^3$) | 0.22 | 0.05 | 0.24 | 0.01 | 0.10 | 0.01 | 1.00 | 1.00 | 0.20 | 0.14 |
| Viscosity (cPs) | 5773 | 737 | 11030 | 1298 | 8631 | 787 | 143800 | 16669 | 8669 | 1527 |
| Film Healing, 25° C. | Yes | No | Yes | No | No | No | Yes | No | No | No |
| Film Healing, 55° C. | Yes | No | Yes | No | No | No | Yes | No | Yes | No |
| Stress Relaxation, 2% (1-10 sec, %) | No data | No data | 60 | 4 | 55 | 6 | No data | No data | No data | No data |

TABLE 3B

| Formulations 11-17. All amounts listed in parts by weight. | | | | | | | |
|---|---|---|---|---|---|---|---|
| Formulation | 11 | 12 | 13 | 14 | 15 | 16 | 17 |
| Oligomer 9 | 80 | | | | | | |
| Oligomer 17 | | 50 | | | 75 | | |
| Oligomer 12 | | | 60 | | | | |
| Oligomer 11 | | | | 60 | | | |
| Oligomer 15 | | | | | | | 65 |
| Oligomer 10 | | | | | | 55.69 | |
| EOEOEA | 12.2 | 42.2 | 32.2 | 32.2 | 17.2 | 35.7 | 27.2 |
| TMPTA | 0.5 | 0.5 | 0.5 | 0.5 | 0.5 | 0.55 | 0.5 |
| VC | 5 | 5 | 5 | 5 | 5 | 5.5 | 5 |

TABLE 3B-continued

| Formulations 11-17. All amounts listed in parts by weight. | | | | | | | |
|---|---|---|---|---|---|---|---|
| Formulation | 11 | 12 | 13 | 14 | 15 | 16 | 17 |
| TPO | 1.2 | 1.2 | 1.2 | 1.2 | 1.2 | 1.33 | 1.2 |
| Irganox 1035 | 0.6 | 0.6 | 0.6 | 0.6 | 0.6 | 0.66 | 0.6 |
| Silyl Acrylate | 0.5 | 0.5 | 0.5 | 0.5 | 0.5 | 0.55 | 0.5 |
| TOTALS | 100 | 100 | 100 | 100 | 100 | 100 | 100 |
| UPy Equivalents | 0.023 | 0 | 0.033 | 0.033 | 0 | 0.043 | 0.021 |
| Disulfide Equivalents | | 0.061 | | | 0.091 | 0.043 | |
| (Meth)Acrylate Equivalents | 0.138 | 0.328 | 0.232 | 0.283 | 0.226 | 0.257 | 0.214 |
| Tensile Strength (MPa) | 0.1 | 0.5 | 0.1 | 0.1 | 0.2 | 1.4 | 0.2 |
| Elongation (%) | 60 | 58 | 56 | 19 | 29 | 210 | 123 |
| Segment Modulus (MPa) | 0.31 | 1.46 | 0.25 | 0.29 | 1.11 | 4.0 | 0.42 |
| Toughness (N*mm/$mm^3$) | 0.05 | 0.30 | 0.03 | 0.01 | 0.04 | 1.52 | 0.13 |
| Viscosity (cPs) | 4299 | No data | 8086 | 6868 | 12826 | 1744 | 4925 |
| Film Healing, 25° C. | No | No | Yes | Yes | No | Yes | Yes |
| Film Healing, 55° C. | Yes | No | Yes | Yes | No | Yes | Yes |
| Stress Relaxation, 1.5% (1-10 s, %) | 27 | 16 | 41 | 39 | 50 | 61 | 32 |

TABLE 3C

| Formulations 18-22. All amounts listed in parts by weight. | | | | | |
|---|---|---|---|---|---|
| | Formulation | | | | |
| | 18 | 19 | 20 | 21 | 22 |
| Oligomer 1 | 70 | 46.7 | 35 | 23.3 | |
| Oligomer 3 | | 23.3 | 35 | 46.7 | 70 |
| EOEOEA | 22.2 | | | | 22.2 |
| TMPTA | 0.5 | 0.5 | 0.5 | 0.5 | 0.5 |
| VC | 5 | 5 | 5 | 5 | 5 |
| TPO | 1.2 | 1.2 | 1.2 | 1.2 | 1.2 |
| Irganox 1035 | 0.6 | 0.6 | 0.6 | 0.6 | 0.6 |
| Silyl Acrylate | 0.5 | 0.5 | 0.5 | 0.5 | 0.5 |
| TOTALS | 100 | 100 | 100 | 100 | 100 |
| UPy Equivalents | 0.042 | 0.027 | 0.021 | 0.014 | 0 |
| (Meth)Acrylate Equivalents | 0.203 | 0.203 | 0.203 | 0.203 | 0.203 |
| Tensile Strength (MPa) | 0.5 | 0.3 | 0.3 | 0.2 | 0.3 |
| Elongation (%) | 124 | 83 | 93 | 75 | 79 |
| Segment Modulus (MPa) | 0.88 | 0.60 | 0.47 | 0.40 | 0.26 |
| Viscosity (cPs) | 10959 | No data | No data | No data | 7840 |
| Film Healing, 25° C. | Yes | No data | No data | No data | No |
| Stress Relaxation, 1.5% (1-10 s, %) | 39 | 34 | 29 | 20 | 4 |

TABLE 3D

| Mechanical recovery of select formulations. All amounts listed in parts by weight. | | | | |
|---|---|---|---|---|
| | Formulation | | | |
| | 3 | 4 | 9 | 10 |
| Oligomer 1 | 70 | | | |
| Oligomer 3 | | 70 | | |
| Oligomer 6 | | | 70 | |
| Oligomer 7 | | | | 70 |
| EOEOEA | 22.2 | 22.2 | 22.2 | 22.2 |
| 2-HEA | | | | |
| TMPTA | 0.5 | 0.5 | 0.5 | 0.5 |
| VC | 5 | 5 | 5 | 5 |

TABLE 3D-continued

| Mechanical recovery of select formulations. All amounts listed in parts by weight. | | | | |
|---|---|---|---|---|
| | Formulation | | | |
| | 3 | 4 | 9 | 10 |
| TPO | 1.2 | 1.2 | 1.2 | 1.2 |
| Irganox 1035 | 0.6 | 0.6 | 0.6 | 0.6 |
| Silyl Acrylate | 0.5 | 0.5 | 0.5 | 0.5 |
| TOTALS | 100 | 100 | 100 | 100 |
| UPy Equivalents | 0.042 | 0 | 0.032 | 0 |
| (Meth)Acrylate Equivalents | 0.203 | 0.203 | 0.208 | 0.208 |
| Tensile Strength (MPa) | 0.3 | 0.1 | 0.5 | 0.4 |
| Elongation (%) | 128 | 48 | 75 | 52 |
| Segment Modulus (MPa) | 0.77 | 0.27 | 1.34 | 1.13 |
| Toughness (N*mm/$mm^3$) | 0.24 | 0.01 | 0.20 | 0.14 |
| Viscosity (cPs) | 11030 | 1298 | 8669 | 1527 |
| Film Healing, 25° C. | Yes | No | No | No |
| Film Healing, 55° C. | Yes | No | Yes | No |
| Stress Relaxation, 2% (1-10 sec, %) | 60 | 4 | No data | No data |
| Film Mechanical Recovery (23 C. Overnight), % | 78 | 0 | 13 | 0 |
| Film Mechanical Recovery (55 C. Overnight), % | No data | 0 | 52 | 0 |

Unless otherwise specified, the term wt. % means the amount by mass of a particular constituent relative to the entire liquid radiation curable composition into which it is incorporated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While the invention has been described in detail and with reference to specific embodiments thereof, it will be apparent to one of ordinary skill in the art that various changes and modifications can be made therein without departing from the spirit and scope of the claimed invention.

What is claimed is:

1. A method for synthesizing an oligomer mixture with one or more moieties capable of forming a multi-hydrogen bonding dimer, the method comprising the steps of:

(1) providing an intermediate reaction product which is the reaction product of a multi-hydrogen bonding group precursor compound having an amino group with a multifunctional isocyanate compound;

(2) adding a polyol component directly to the intermediate reaction product to yield an oligomer mixture comprising one or more multi-hydrogen bonding groups;

(3) further reacting the oligomer mixture with an isocyanate-reactive compound also optionally having at least one additional reactive group to yield one or more multi-hydrogen bonding oligomers;

wherein a quantity of unreacted isocyanate groups remains present in the intermediate reaction product after completion of step (1) and in the oligomer mixture after completion of step (2);

wherein, relative to all reagents used in the synthesis of the one or more multi-hydrogen bonding oligomers, solvents comprise less than 50% of the total by weight; and wherein, in the method, a ratio of the equivalents of the multi-hydrogen bonding group precursor compound having an amino group used to a. the multifunctional isocyanate compound used is from 1:3 to 1:8;

b. the polyol component used is from 1:1.5 to 1:6; and c. the isocyanate-reactive compound also optionally having at least one additional reactive group used is from 1:0.5 to 1:1.5;

wherein the one or more multi-hydrogen bonding oligomers comprise an oligomer possessing the structure (IX)-(XIX), (XXI), (XXIII), (XXV)-(XXVI), (XXXI), (XXXV), (XL) or a mixture thereof:

(IX)

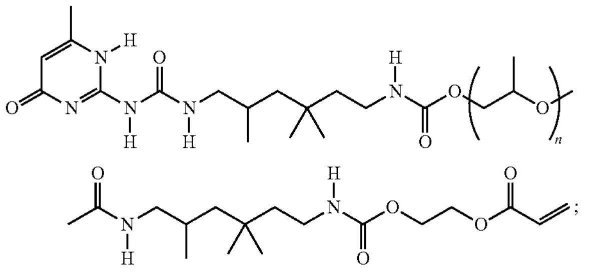

(X)

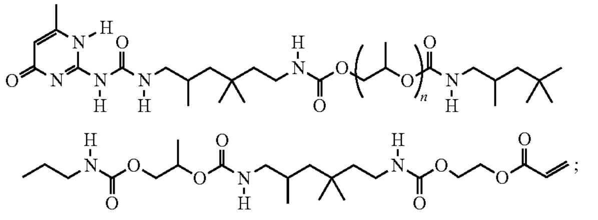

(XI)

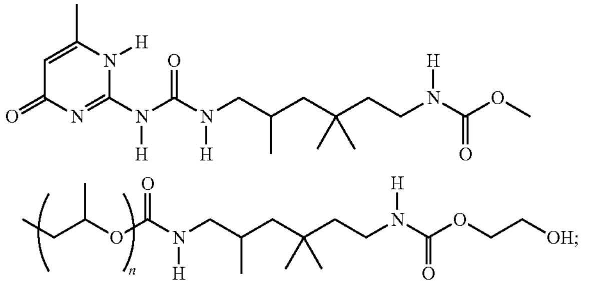

(XII)

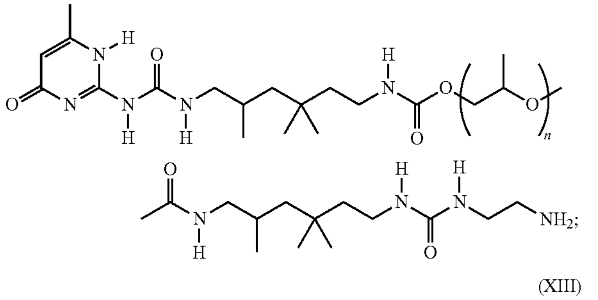

(XIII)

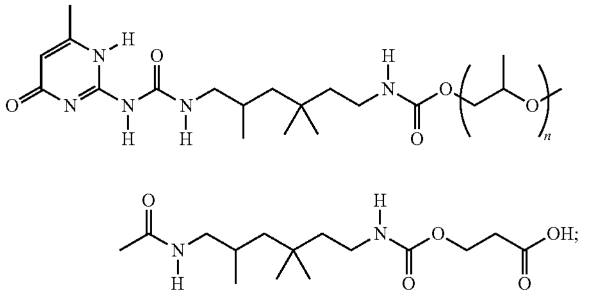

-continued
(XIV)
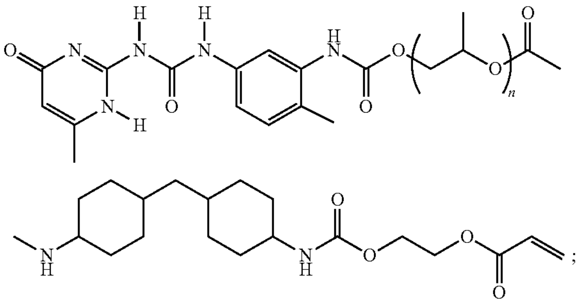
(XV)
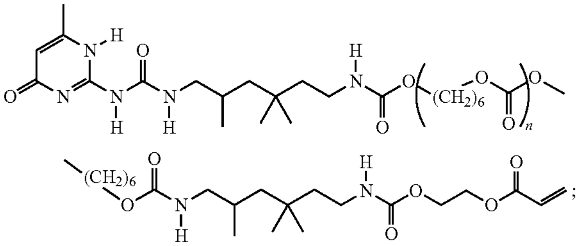
(XVI)
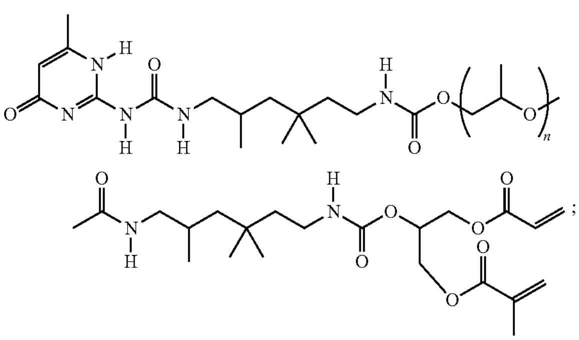
(XVII)
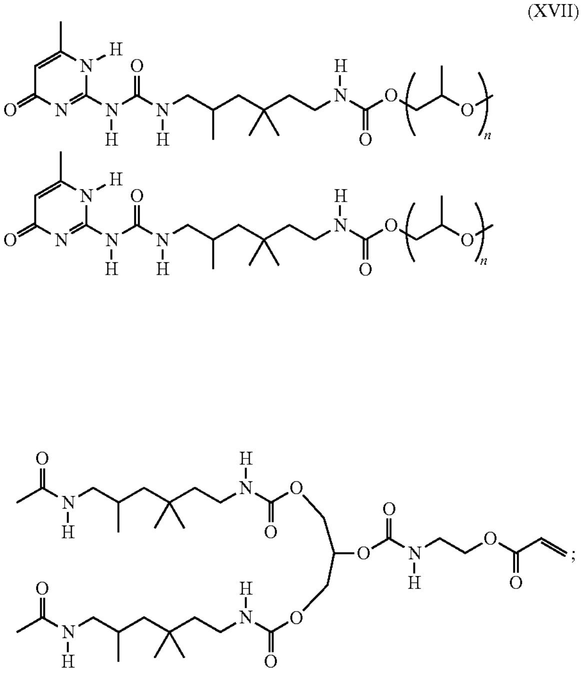
-continued
(XVIII)
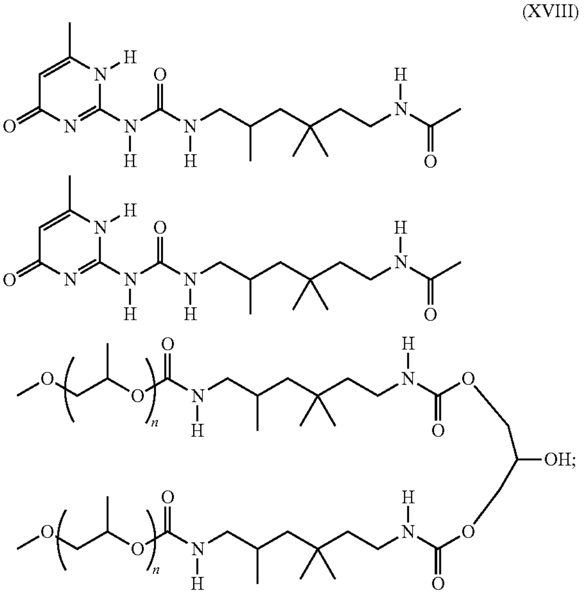
(XIX)
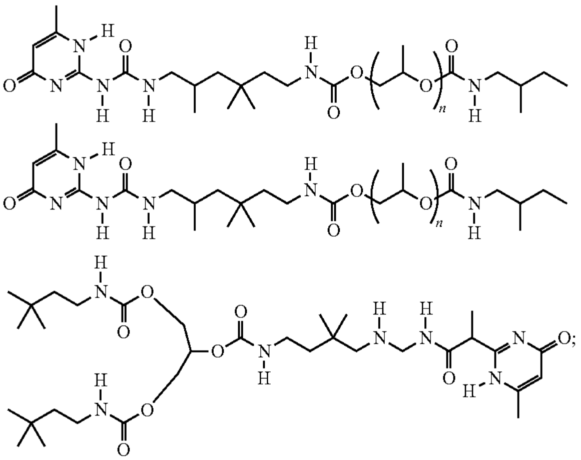
(XXI)
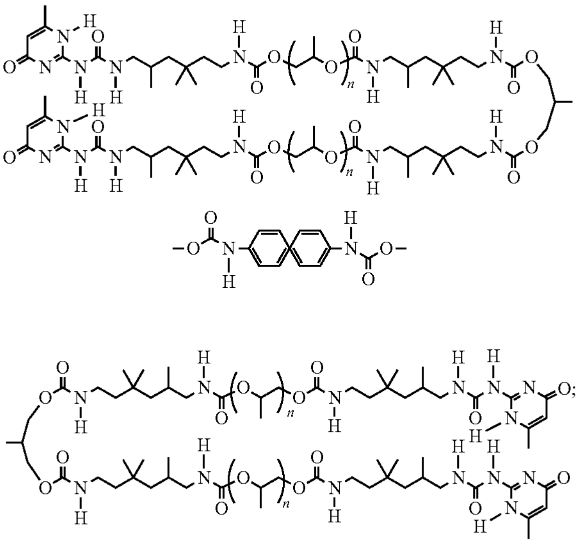

-continued (XXIII)

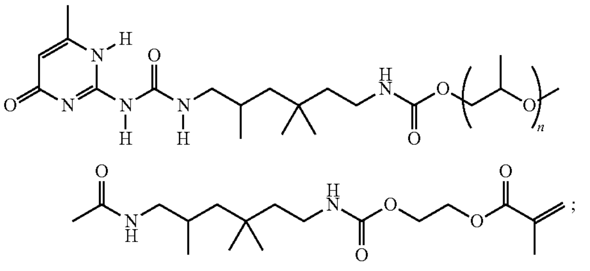

(XXV)

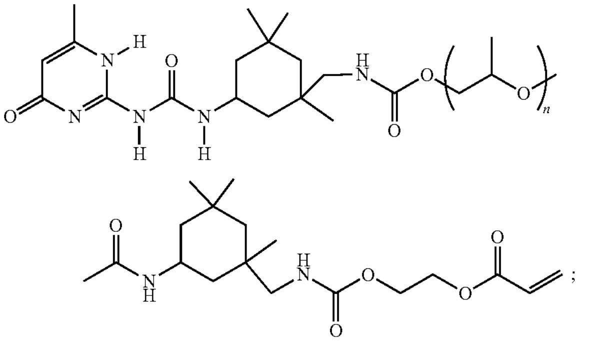

(XXVI)

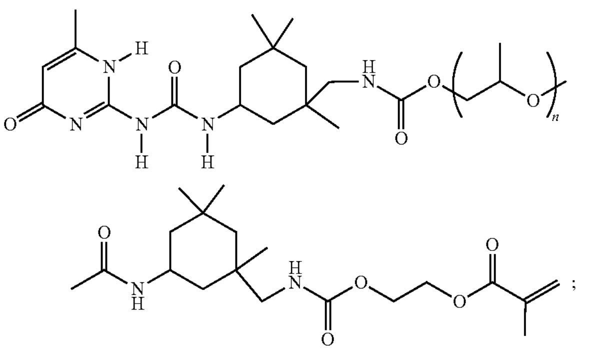

(XXXI)

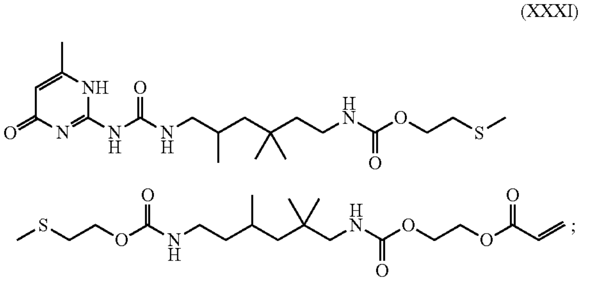

(XXXV)

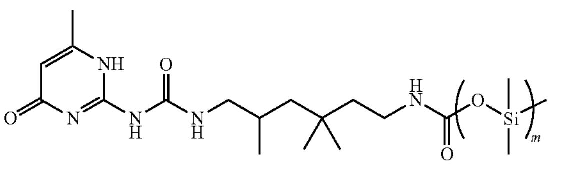

-continued

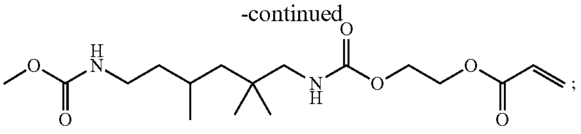

+

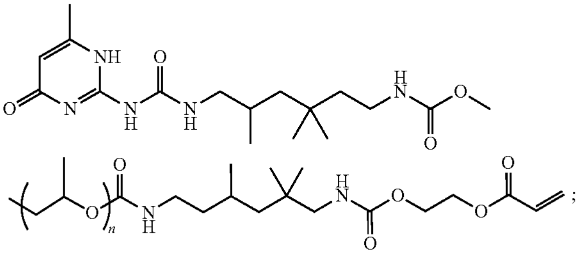

(XL)

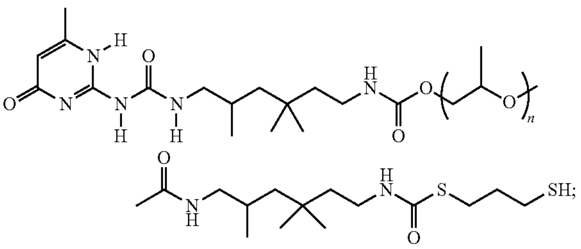

wherein n is greater than 0 and may be any number provided that the MW theo of the oligomer is less than 5000 g/mol;

wherein, for each occurrence of an acrylate group above, a methacrylate group alternatively may be substituted therefor, and for each occurrence of a methacrylate group above, an acrylate group alternatively may be substituted therefor.

2. The method according to claim 1, wherein no separation, distillation, or isolation of the of the intermediate reaction product occurs prior to the adding step (2).

3. The method according to claim 1, wherein no separation, distillation, or isolation of the oligomer mixture occurs prior to the further reacting step (3).

4. The method according to claim 1, wherein the method is a continuous or one-pot process.

5. The method according to claim 1, wherein the oligomer mixture and/or the one or more multi-hydrogen bonding oligomers comprise less than 40 wt. % of solvents.

6. The method according to claim 1, wherein the multi-hydrogen bonding group precursor compound having an amino group comprises a 2-amino-4-hydroxy-6-alkyl-pyrimidine.

7. The method according to claim 1, wherein the multi-functional isocyanate compound comprises trimethylhexamethylene diisocyanate, 2,4-tolylenediisocyanate, 2,6-tolylenediisocyanate, isophorone-diisocyanate, diphenylmethane-4,4'-diisocyanate, hexamethylenediisocyanate, cyclohexanediisocyanate, dicyclohexylmethylene diisocyanate, phenylenediisocyanate, naphthalene diisocyanate, triphenylmethanetriisocyanate, toluene-2,4,6-triisocyanate, or a mixture thereof.

8. The method according to claim 1, wherein the polyol component comprises a polyether polyol, a polyester polyol, a poly(dimethylsiloxane), a disulfide polyol, or a mixture thereof.

9. The method according to claim 1, wherein the isocyanate-reactive compound possesses a hydroxyl, an amino, or a thiol group and further comprises a triol or a hydroxyl-functional (meth)acrylate monomer.

10. The method according to claim 1, wherein step (1) is preceded by the step of reacting the multi-hydrogen bonding group precursor compound having an amino group with the multifunctional isocyanate compound at a temperature of between 110-160° C. until mixture becomes clear.

11. The method according to claim 1, wherein step (2) is carried out at a temperature of 60 to 120° C. for a mixing duration until all or substantially all hydroxyl groups from the polyol component have reacted with the multifunctional isocyanate compound, as determined according to an NCO titration method.

12. The method according to claim 1, wherein step (2) comprises adding the polyol component directly to the intermediate reaction product in the presence of a catalyst and/or an inhibitor.

13. The method according to claim 1, wherein step (3) comprises further reacting the oligomer mixture in the presence of a catalyst and/or an inhibitor.

14. The method according to claim 1, wherein step (3) comprises removing nitrogen protection and controlling the reaction at a temperature of 60 to 120° C. for a mixing duration until reaction completion, as determined according to an NCO titration method.

15. The method according to claim 12, wherein the catalyst comprises organometallic tin, bismuth, zinc, lead, copper, iron, dibutyltin dilaurate, dibutyltin diacetate, stannous octoate, bismuth octoate, bismuth neodecanoate, zinc 2-ethylhexanote, or lead octoate, or a combination thereof; and/or wherein the inhibitor comprises a phenolic inhibitor.

16. The method of claim 1, wherein:

the oligomer of the structure (XI) has the structure (XXXIV):

(XXXIV)

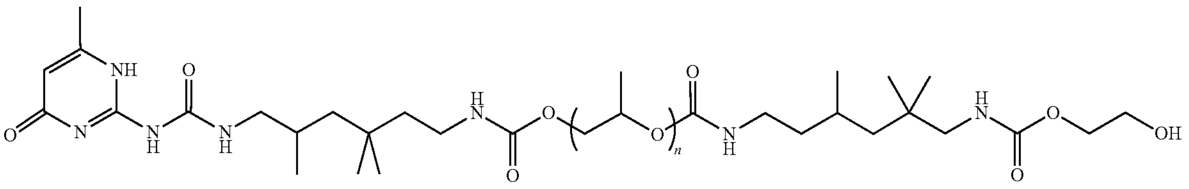

Polyol MW 1000 the oligomer of the structure (IX) has the structure (XXII):

(XXII)

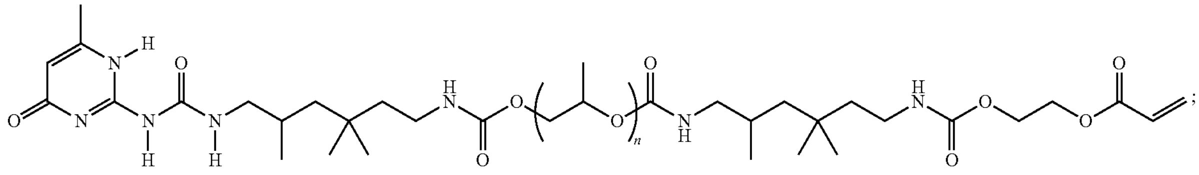

Polyol MW 1000 the oligomer of the structure (IX) has the structure (XXIX):

(XXIX)

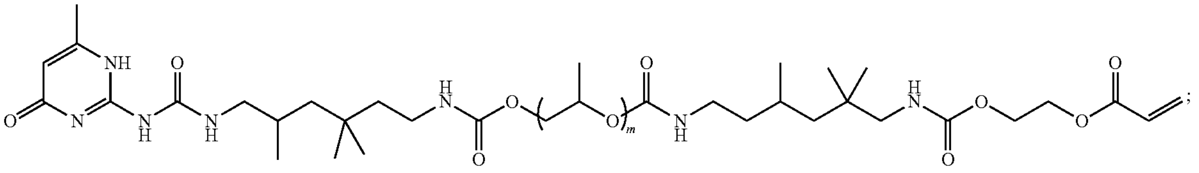

Polyol MW 600 the oligomer of the structure (IX) has the structure (XXX):
(XXX)
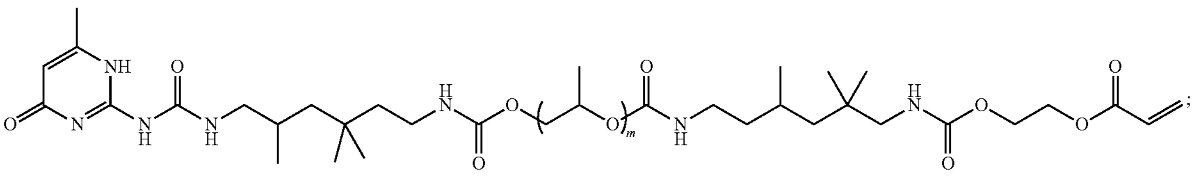
Polyol MW 2000
the oligomer of the structure (XVI) has the structure (XXXII):
(XXXII)
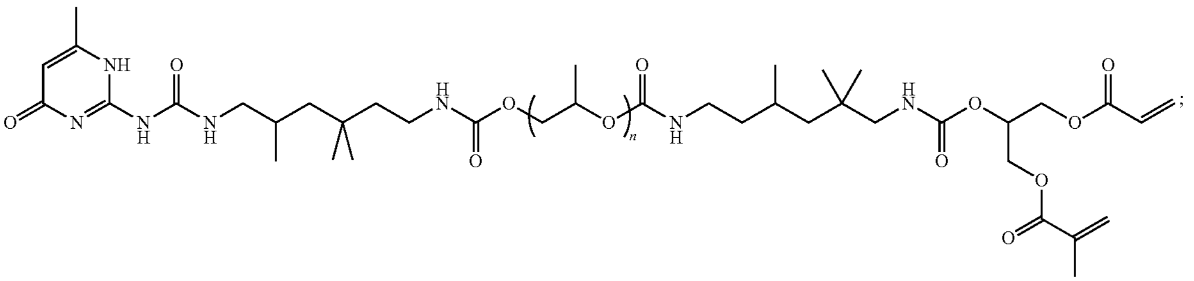
Polyol MW 1000
the oligomer of the structure (XVII) has the structure (XXXIII):
(XXXIII)
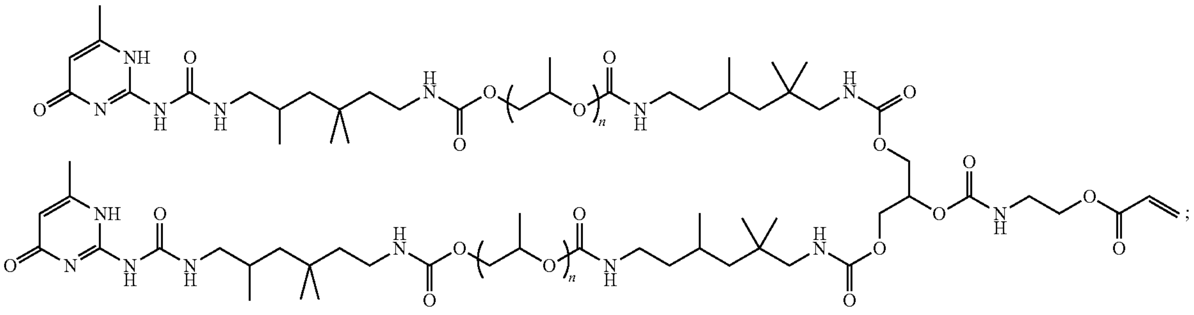
Polyol MW 1000
the oligomer of the structure (XXXV) has the structure (XXXVI):
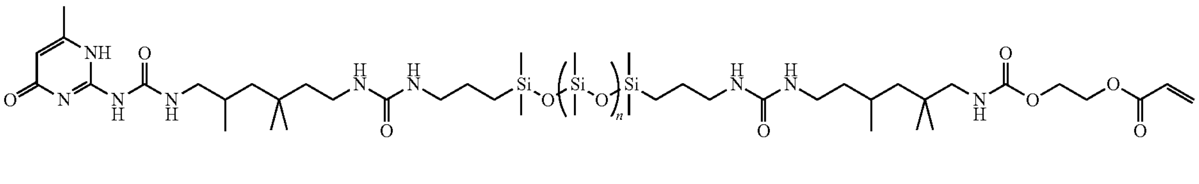

Bis(3-aminopropyl) terminated poly(dimethylsiloxane) MW 2500 5 mol %
(XXXVI)
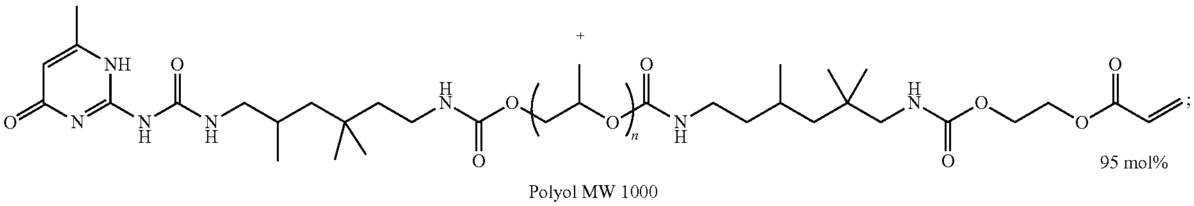
the oligomer of the structure (XXXV) has the structure (XXXVII):
(XXXVII)
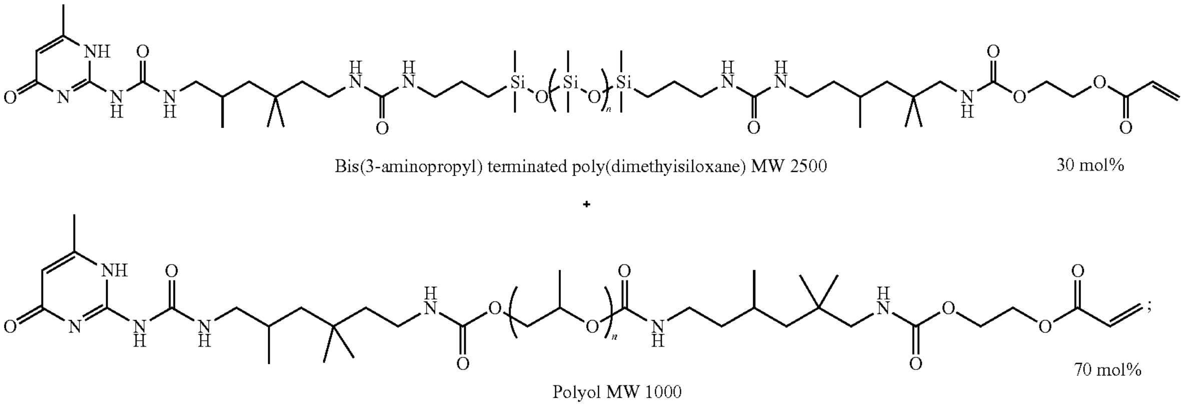
or
the oligomer of the structure (XXVI) has the structure (XXVII):
(XXVII)
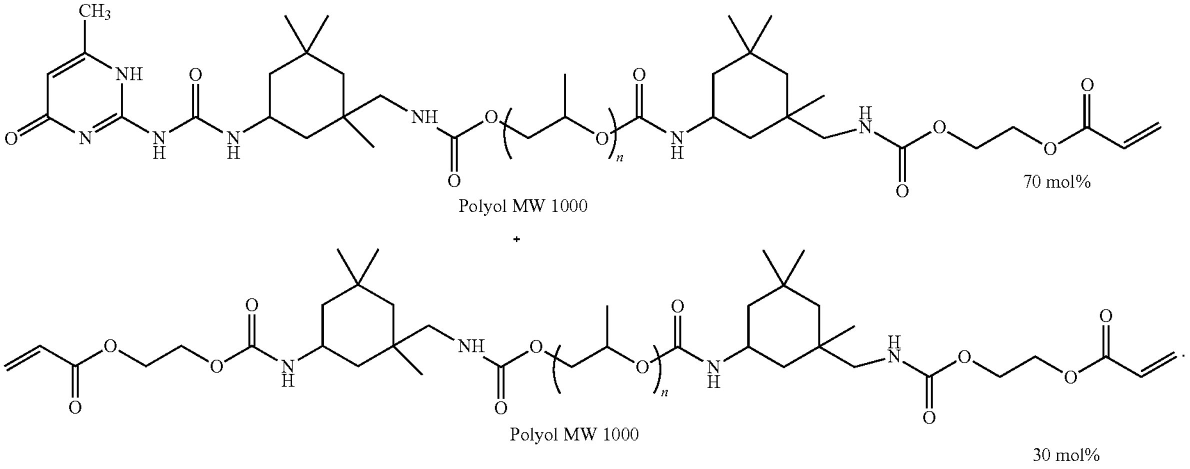
* * * * *